US010550555B2

(12) United States Patent
Chen

(10) Patent No.: US 10,550,555 B2
(45) Date of Patent: Feb. 4, 2020

(54) TOUCH FREE CONTROL OF FAUCET

(71) Applicant: Chung-Chia Chen, La Habra Heights, CA (US)

(72) Inventor: Chung-Chia Chen, La Habra Heights, CA (US)

(*) Notice: Subject to any disclaimer, the term of this patent is extended or adjusted under 35 U.S.C. 154(b) by 0 days.

(21) Appl. No.: 15/884,232

(22) Filed: Jan. 30, 2018

(65) Prior Publication Data

US 2018/0216325 A1   Aug. 2, 2018

Related U.S. Application Data

(60) Provisional application No. 62/452,554, filed on Jan. 31, 2017.

(51) Int. Cl.
*E03C 1/05* (2006.01)
*E03C 1/04* (2006.01)
*G05D 7/06* (2006.01)
*G05D 23/19* (2006.01)
*E03C 1/02* (2006.01)

(52) U.S. Cl.
CPC .............. *E03C 1/057* (2013.01); *E03C 1/041* (2013.01); *E03C 1/0405* (2013.01); *G05D 7/0635* (2013.01); *E03C 2001/026* (2013.01); *G05D 23/1902* (2013.01); *G05D 23/1917* (2013.01)

(58) Field of Classification Search
None
See application file for complete search history.

(56) References Cited

U.S. PATENT DOCUMENTS

| 6,308,351 | B1 | 10/2001 | Franke | |
|---|---|---|---|---|
| 9,170,720 | B2 | 10/2015 | Plate et al. | |
| 2011/0031331 | A1* | 2/2011 | Klicpera | B05B 12/008 239/71 |
| 2011/0185493 | A1* | 8/2011 | Chen | E03C 1/057 4/623 |

(Continued)

OTHER PUBLICATIONS

Ed Grabianowski, "How Speech Recognition Works", HowStuffWorks.com, dated Nov. 10, 2006. <https://electronics.howstuffworks.com/gadgets/high-tech-gadgets/speech-recognition.htm>.

(Continued)

Primary Examiner — Ziaul Karim
(74) Attorney, Agent, or Firm — Knobbe, Martens, Olson & Bear, LLP

(57) ABSTRACT

A touch free faucet for providing a convenient and hygienic means of washing hands and/or performing other tasks associated with faucets can include a logic processor, a sensor that can generate signals in response to detecting an activation motion within a sensor zone, and a microphone that can detect sound signals arising from a voice command by a user. The logic processor can receive the generated signals from the sensor and/or the detected sound signals from the microphone and control operation of the touch free faucet based on such signals. Additionally, the touch free faucet can include a wireless receiver that can receive digital instructions from a networked computing device and communicate the received digital instructions to the logic processor in order to control operation of the touch free faucet. The touch free faucet can include two microphones that can be utilized to filter out water sounds from voice commands.

20 Claims, 15 Drawing Sheets

(56) References Cited

U.S. PATENT DOCUMENTS

| | | | |
|---|---|---|---|
| 2012/0017367 A1* | 1/2012 | Reeder | E03C 1/055 |
| | | | 4/597 |
| 2012/0124737 A1* | 5/2012 | Gibson | E03C 1/048 |
| | | | 4/643 |
| 2014/0102541 A1* | 4/2014 | Mittal | F17D 3/00 |
| | | | 137/2 |
| 2018/0058049 A1 | 3/2018 | Seggio et al. | |
| 2018/0216324 A1* | 8/2018 | Beck | E03C 1/0412 |

OTHER PUBLICATIONS

John Sciacca, "Smarten Up Your Dumb House with Z-Wave Automation", DigitalTrends.com, dated Nov. 7, 2013. <http://www.digitaltrends.com/home/smarten-dumb-house-z-wave-automation.htm>.

* cited by examiner

TOUCH FREE CONTROL OF FAUCET

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entireties under 37 CFR 1.57.

BACKGROUND OF THE INVENTION

Field

Certain embodiments disclosed herein relate to touch free faucets including voice and/or sensor controls configured to support multiple modes of operation. In particular, some embodiments disclosed include operation of one or more touch free faucets using networked computing devices and/or systems.

Description of the Related Art

Touch free faucets can provide a more convenient and hygienic means of washing hands and performing other tasks associated with traditional faucets. Touch-free faucets typically operate by sensing the presence of an object in a detection area, and pouring water in response to that detected object. However, there remains a need to enhance the available features of faucet assemblies with touch-free capabilities and to allow users an opportunity to manipulate various functional attributes.

SUMMARY OF THE INVENTION

Certain aspects, advantages and novel features of embodiments of the invention are described herein. It is to be understood that not necessarily all such advantages may be achieved in accordance with any particular embodiment of the invention disclosed herein. Thus, the invention disclosed herein may be embodied or carried out in a manner that achieves or selects one advantage or group of advantages as taught herein without necessarily achieving other advantages as may be taught or suggested herein. Though primarily disclosed in the context of a faucet, other assemblies can utilize the disclosed sensor assemblies.

In some embodiments, the touch free faucet can be configured to permit water to flow into a basin area (e.g., any area or region that a faucet can provide water to or on, such as a kitchen or bathroom sink, or a bathing area such as a shower floor, tub, or another area). The touch free faucet can comprise a sensor configured to generate an activation signal in response to detecting a motion within a sensor zone and communicate such generated activation signal to a hardware processor, wherein the hardware processor can control a first operation of one or more mechanical valves to place the touch free faucet into a flow mode based on the generated activation signal. The hardware processor can be within the touch free faucet, or alternatively, be outside the touch free faucet (e.g., the logic processor can be near one or more mechanical valves below or otherwise outside the touch free faucet). The touch free faucet can also comprise a first microphone configured to: detect a sound signal responsive to a voice command by a user, the voice command corresponding to an instruction to control a second operation of the one or more mechanical valves; and communicate the detected sound signal to the hardware processor, wherein the hardware processor can be further configured to convert the detected sound signal into a digital format and control an operating characteristic of the flow mode based on the converted, digitally-formatted sound signal. The touch free faucet can also comprise a power supply configured to provide power to the touch free faucet. The touch free faucet can further comprise a speaker, wherein, when the hardware processor controls an operating characteristic of the flow mode based on the converted, digitally-formatted sound signal, the hardware processor can instruct the speaker to transmit a confirmation sound or phrase. The instruction can comprise a directive to increase the flow rate of water flowing through the touch free faucet. The touch free faucet can further comprise a temperature sensor configured to detect the temperature of water flowing through the touch free faucet and communicate the detected water temperature to the hardware processor. The instruction can comprise a directive to set or stabilize the temperature of water flowing through the touch free faucet at a preset temperature stored in a memory unit in communication with the hardware processor. The hardware processor can, upon receiving the detected temperature of water flowing through the touch free faucet from the temperature sensor, control operation of the one or more mechanical valves until the detected temperature communicated by the temperature sensor falls within a predetermined threshold of the stored preset temperature. The temperature sensor can be configured to intermittently or continuously provide temperature readings to the hardware processor. Stabilization of water temperature can be an iterative process, whereby the temperature sensor communicates temperature readings to the hardware processor and the hardware processor receives the communicated temperature readings and attempts to stabilize the water temperature accordingly. This can enable the hardware processor to stabilize the temperature of water running through the touch free faucet because the hardware processor, after receiving a detected water temperature, can compare such received detected temperature with a preset (which also can be programmed by a user) temperature and adjust one or more mechanical valves to bring the water temperature closer to the preset temperature. When the detected water temperature falls within some pre-programmed (which can also be programmed by a user at a later time) threshold of the preset temperature (e.g., 1 degree), the hardware processor can stop its communication with the one or more mechanical valves (e.g., can leave the one or more mechanical valves in the recent configuration so as to allow the water temperature to remain the same). The instruction can comprise a directive to increase the temperature of water flowing through the touch free faucet. For example, a user could issue a voice command comprising an instruction such as "Increase Water Temp." When the hardware processor detects that the temperature of water flowing through the touch free faucet has reached a preset maximum user value (which can be also re-programmed by a user), the hardware processor can control operation of the one or more mechanical valves to stabilize the temperature at the preset maximum user value. Such stabilization can be similar to that described above. The touch free faucet can comprise a second microphone located on a front surface of the touch free faucet facing the basin area and configured to detect and communicate sound signals originating from water flowing through the touch free faucet and contacting the basin area to the hardware processor, wherein the first microphone can be located on a back surface of the touch free faucet facing away from the basin area, and wherein the hardware processor can be configured to store the communicated sound signals from the second microphone in a memory unit. The touch free faucet and/or the hardware processor can be configured such that, when the touch free faucet is operating in a continuous flow mode and the hardware processor fails to receive a generated activation signal from the sensor and a detected sound signal from the first microphone for a preset time period, the hardware processor can automatically control operation of the one or more mechanical valves to stop water from flowing through the touch free faucet. The preset time period can be adjusted or re-programmed by a user. For example, a user may wish to program the time period to be 20 seconds or a different time period. This automatic shut off feature can advantageously be employed to conserve water. The touch free faucet can further comprise a wireless receiver configured to receive digital instructions over a communication protocol and communicate the received digital instructions to the hardware processor to control operation of the one or more mechanical valves, wherein the communication protocol is selected from the group consisting of Bluetooth, Wi-Fi Ethernet, ZigBee, Z-Wave, cellular telephony, infrared, and satellite transmission, the wireless receiver further configured to communicate the received digital instructions to the hardware processor.

In some embodiments, a touch free faucet configured to permit water to flow into a basin area can comprise: a first microphone configured to detect a first sound signal; a second microphone configured to detect a second sound signal; and one or more hardware processors configured to receive the detected first sound signal from the first microphone, receive the detected second sound signal from the second microphone; and control an operation of the touch free faucet based on the detected first sound signal and the detected second signal, wherein placement of the first microphone and the second microphone can enable the one or more hardware processors to distinguish a sound of water flow from a voice command by a user. Such placement of the first and second microphone can permit one of the microphones to receive a greater amplitude of sounds originating from the touch free faucet, which can help in the filtering-out processors or methods that are described herein. The first microphone can be located on a front surface of the touch free faucet facing the basin area and the second microphone can be located on a back surface of the touch free faucet facing away from the basin area. The first sound signal can originate from water flowing through the touch free faucet and into the basin area and the second sound signal can originate from the voice command by the user, and the one or more hardware processors can be further configured to: store the detected first sound signal in a memory unit and create a first frequency profile based on the detected first sound signal; store the detected second sound signal in the memory unit and create a second frequency profile based on the detected second sound signal; and create a filtered frequency profile representative of the difference between the second frequency profile and the first frequency profile. The touch free faucet can further comprise a speech recognition module in communication with the one or more hardware processors, wherein, if the filtered frequency profile is greater than a predetermined threshold, the one or more hardware processors can instruct the speech recognition module to analyze and convert the filtered frequency profile to a digital format, whereby the one or more hardware processors can control operation of one or more mechanical valves based on the converted, digitally-formatted filtered frequency profile. The filtered frequency profile can comprise an instruction to control operation of one or more mechanical valves to increase the water flow rate of water flowing through the touch free faucet.

In some embodiments, a touch free faucet configured to permit water to flow into a basin area can comprise: a wireless receiver configured to receive digital instructions over a communication protocol selected from the group consisting of Bluetooth, Wi-Fi Ethernet, ZigBee, Z-Wave, cellular telephony, infrared, and satellite transmission, and the wireless receiver can be further configured to communicate the received digital instructions to a logic processor; and a power supply configured to provide power to the touch free faucet, wherein the logic processor can be configured to control operation of one or more mechanical valves based on the digital instructions received from the wireless receiver. The wireless receiver can be configured to receive digital instructions from a networked computing device. The received digital instructions can comprise a command to control operation of the one or more mechanical valves to permit water to flow through the touch free faucet at a specified temperature. The wireless receiver can be configured to receive instructions from a wireless transmitter in a control console, and the control console can comprise at least one of: a sensor configured to generate an activation signal in response to detecting a motion within a sensor zone and communicate such generated activation signal to a second logic processor within the control console, the generated activation signal comprising a first instruction for controlling operation of the touch free faucet; or a microphone configured to detect a sound signal arising from a voice command by a user and communicate the detected sound signal to the second logic processor within the control console, the voice command comprising a second instruction for controlling operation of the touch free faucet.

An aspect of the present disclosure relates to a system for controlling operation of one or more touch free faucets in an environment, such as a home or office. Such a system can include one or more touch free faucets configured to receive water from one or more mechanical valves and direct the water flow into a basin area. The one or more touch free faucets of this system can include a logic processor configured to control operation of one or more mechanical valves and a wireless receiver configured to receive digital instructions and communicate the received digital instructions to the logic processor. The logic processor, in response to receiving the digital instructions from the wireless receiver, can control operation of the one or more mechanical valves. The system can further include a control console comprising a logic processor and a wireless transmitter configured to send digital instructions to the wireless receiver of the touch free faucet. The touch free faucet and/or the control console can include, or receive power from, a power supply. In some embodiments, the bathing area is a tub having a tub rim, wherein the control console is configured for removable attachment to the tub rim. Such removable attachment can comprise, for example, one or more suction cups, such as one, two, three, four, five, or six or more suction cups. Alternatively, the control console can be configured to be permanently attached to the tub rim or alternatively can rest upon but not be attached to the tub rim. The system can further comprise one or more temperature sensor units which can include a temperature sensor and a wireless transmitter, and the control console can further comprise a wireless receiver, wherein the one or more temperature sensor units can be configured to detect water temperature in the bathing area and transmit the detected water temperature to the wireless receiver in the control console. The control console of the system can further comprise a wireless receiver configured to receive digital instructions from a networked computing device and send the received digital instructions to the wireless receiver of the touch free faucet via a communications protocol selected from the group consisting of Bluetooth, Wi-Fi Ethernet, ZigBee, Z-Wave, cellular telephony, infrared, and satellite transmission. The control console of the system can further comprise one or more sensors configured to generate signals in response to detecting an activation motion, wherein the one or more sensors can be further configured to communicate the generated signals to the logic processor of the control console, wherein the logic processor of the control console can be further configured to analyze the generated signals, convert the generated signals into directives, and communicate the directives to the wireless transmitter of the control console which can be itself configured to send the directives to the wireless receiver of the touch free faucet. The wireless receiver of the touch free faucet can be configured to communicate the directives to the logic processor of the touch free faucet which can thereby control operation of the one or more mechanical valves. The control console of the system can further comprise one or more microphones configured to detect sound signals and communicate the detected sound signals to the logic processor of the control console, wherein the logic processor of the logic processor can be further configured to analyze the detected sound signals, convert the detected sound signals into directives, and communicate the directives to the wireless transmitter of the control console which can be configured to send the directives to the wireless receiver of the faucet, the wireless receiver of the touch free faucet. The wireless receiver of the touch free faucet can be configured to communicate the directives to the logic processor of the touch free faucet which can thereby control operation of the one or more mechanical valves.

DETAILED DESCRIPTION

Figure 1A:
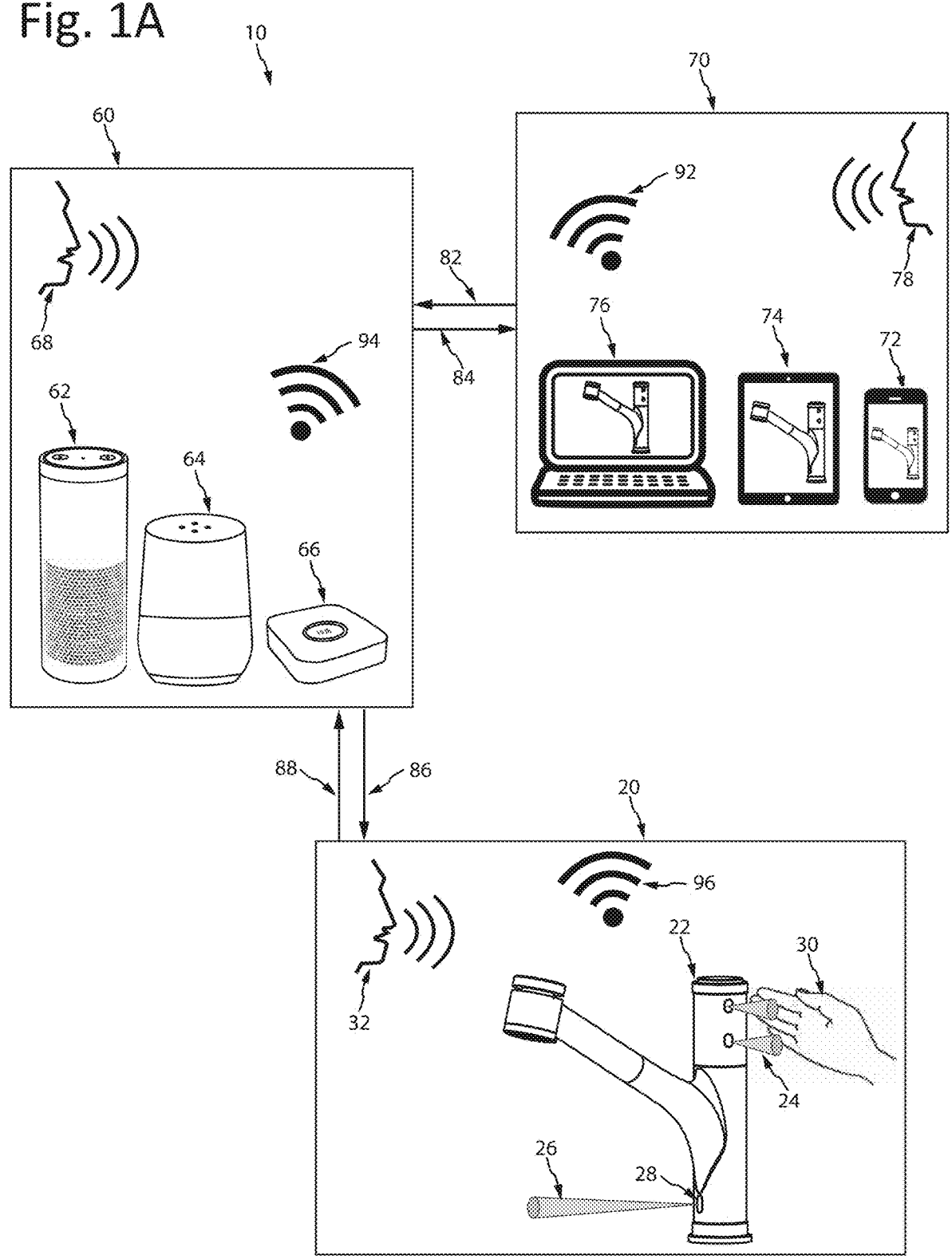
FIG. 1A illustrates a wireless computing environment including networked computing devices programmed to communicate with a touch free faucet.

A touch free faucet can include one or more sensors for controlling operation of the touch free faucet. For example, the touch free faucet can include one, two, three, four, five, six, or seven or more sensors. The operation can include turning on and off flow of water, continuous flow of water, changing preset mode, changing temperature of the flow of water, changing flow rate of the flow of water. Example operations of touch free faucets using sensors are discussed in detail in U.S. Pat. No. 9,347,207 to Chen which is incorporated by reference herein in its entirety. The one or more sensors can sense the presence of one or more objects in sensors zones. For example, the one or more sensors can include an optical sensor that can sense the presence of an object in a sensor zone in front of the optical sensor. As another example, the one or more sensors can include an infrared sensor that can detect the presence of a warmth-emitting object within a certain distance in front of the one or more infrared sensors. The one or more sensors can, after sensing one or more objects, transmit one or more signals in response to a logic processor, such as the logic processors discussed herein.

The touch free faucet can also include one or more microphones. For example, the touch free faucet can include one, two, three, four, five, six, or seven or more microphones. The one or more microphones can detect sound signals and communicate such detected signals to a logic processor, such as a hardware processor, microprocessor or microcontroller, for controlling one or more operations of the touch free faucet as discussed more in detail below. The one or more microphones can detect sound signals at different frequencies. For example, the touch free faucet can include a first microphone that can detect sound signals at a first frequency and a second microphone that can detect sound signals at a second frequency. Alternatively, the touch free faucet can include a first microphone that can detect sound signals within a first range of frequencies and a second microphone that can detect sound signals within a second range of frequencies. Alternatively, the touch free faucet can include one microphone that can detect sound signals and/or frequencies originating from water flow from the faucet and communicate such signals and/or frequencies to the logic processor to be stored in a memory (also referred to a as a memory unit herein) to assist the logic processor in differentiating between such signals and other sound signals (such as sounds and/or voice commands from a user). Employing more than one microphone, or configuring a single microphone and/or the logic processor to detect and distinguish between different sound signals and/or frequencies, can advantageously allow the touch free faucet to distinguish between sounds originating from the water flowing from the spout and/or contacting other containment surfaces (e.g., portions of kitchen sinks, showers, or bathroom tubs, or other surfaces) versus other sounds (e.g., sounds from users such as voice commands). The logic processor disclosed herein can receive sound signals detected by one or more microphones and can store such signals. Stored sound signals can be, for example, sounds that are typical in a kitchen and/or bathroom environment depending on the type of faucet. More specifically, the logic processor can store sounds of water flows from a particular faucet. Storing sound signals associated to a particular faucet can be advantageous to enable the logic processor to filter out such sound signals. The touch free faucets disclosed herein can include two microphones for example, one that is positioned near the water flow, and another that is positioned away from the water flow. This can enable the logic processor to more readily distinguish between sound signals due to the flow of water from a faucet from other sounds (such as sounds originating from a human voice).

To protect the one or more microphones from being damaged by water or moisture arising from water flowing into and/or areas nearby the touch free faucet, the touch free faucets described herein can include a mushroom-top-like cap or cover that protrudes around a portion of the location of the one or more microphones on the touch free faucets. For example, a touch free faucet in a kitchen sink area can have one or more microphones facing a direction towards the kitchen sink and/or facing the downward stream of the water flow through the touch free faucet. Such one or more microphones facing such a direction can have this mushroom-top-like cap or cover that can substantially cover an opening by which the one or microphones receive sound waves, but leave open perimeter areas (e.g., areas that do not directly face the water flow stream). Such a cover can greatly decrease the possibility that water will enter into the one or more microphones and/or cause damage. Alternatively, the one or more microphones described herein can have other protection structures, such as a screen with small perforations or holes therewithin, to allow sound waves to pass through the holes to the microphone, but that can greatly reduce the amount of water or moisture that passes through the screen. The one or more microphones can be surrounded by a dome-like protruding shield or screen which has one or more perforations, thereby allowing sound to pass through the one or more perforations to the one or more microphones but reducing the amount of water and/or moisture that passes through the shield or screen to the one or more microphones. The shield or screen discussed herein can be spherical, cubed, rectangular, square, circular oblong, or any other shape or combination of shapes.

The touch free faucet can include one or more wireless receivers for receiving wireless signals from an external device. For example, the touch free faucet can include one, two, three, four, five, six, seven, or eight or more wireless receivers. The external device can be a computing system, a network router, or any networked unit that can communicate using a wireless protocol. The external device can control operation of the touch free faucet using the wireless protocol as described more in detail below.

The touch free faucet can include one or more wireless transmitters for sending wireless signals to external devices. For example, the touch free faucet can include one, two, three, four, five, six, seven, or eight or more wireless transmitters. The external device can be a computing system, a network router, or any networked unit that can communicate using a wireless protocol. The one or more wireless transmitters can send data packets containing, for example, information about the touch free faucet and/or attributes of water flowing through the touch free faucet. For example, the one or more wireless transmitters can send data packets containing information about whether one or more mechanical valves connected to the touch free faucet are at least partially open (and thus allowing water to flow through the touch free faucet) and/or information about water temperature flowing through the touch free faucet, which can be obtained by a temperature sensor.

The touch free faucet can include one or more wireless transceivers for receiving and/or sending wireless signals from an external device. For example, the touch free faucet can include one, two, three, four, five, six, seven, or eight or more wireless transceivers. The one or more wireless transceivers can be used for purposes similar to that described above with reference to wireless receivers and transmitters.

The touch free faucets and/or control consoles/modules and other components referred to in the present disclosure may include various power supply units. Such power supply units can include one or more batteries, which can be rechargeable, a solar cell system, direct current voltage supplied from an AC/DC converter or any combination thereof.

The touch free faucets and/or control console/modules and other components referred to in the present disclosure may include various devices for sensing or detecting the temperature of water flowing through the faucets or valves connected to the faucets. Such temperature sensors (also referred to herein as temperature detectors or temperature detection devices) can include a thermometer, thermistor, thermocouple, or other temperature detection device. Such temperature sensors can transmit one or more water temperature signals to the logic processor disclosed herein, wherein the logic processor, which can be connected to a control valve assembly, can transmit one or more signals to the control valve assembly (which can include one or more mechanical or electrical valves) to instruct the control valve assembly to adjust the level of hot and/or cold water provided to the touch free faucet.

The logic processor described herein can be in communication with a memory unit, which can advantageously store a data object or data structure, such as a saved water temperature and/or flow rate by a user as discussed herein. The memory unit (also referred to as memory herein) can be Random Access Memory (RAM), flash memory, a hard disk, or some other memory storage medium.

The touch free faucets and/or control consoles/modules disclosed herein may include one or more displays (also referred to herein as display panels) that can display properties about water flow and/or temperature or other information (e.g., time, date, day of the week, etc.). Such display can be an LED lighting device, LCD lighting device, other some other type of display.

The touch free faucets and/or control consoles/modules disclosed herein may include one or more LED indicators that can be used to notify a user about characteristics or properties of the touch free faucets and/or control consoles/modules. For example, the touch free faucets and/or control consoles/modules disclosed herein may include one, two, three, four, five, six, seven, or eight or more LED indicators. The one or more LED indicators can display a colored light (such as red, yellow, green, blue or another color) that can indicate that the touch free faucet and/or control consoles/modules are powered on. The one or more LED indicators can also help a user locate the sensor zone so that the user can know where to move a body part or object in order to activate the sensor. In some embodiments, the one or more LED indicators can flash when the touch free faucet is permitting water to flow through the faucet, or alternatively, can flash when the faucet is not permitting water to flow. The one or more LED indicators can operate as described in U.S. Pat. No. 9,347,207 to Chen which is incorporated by reference herein in its entirety.

Figure 2A:
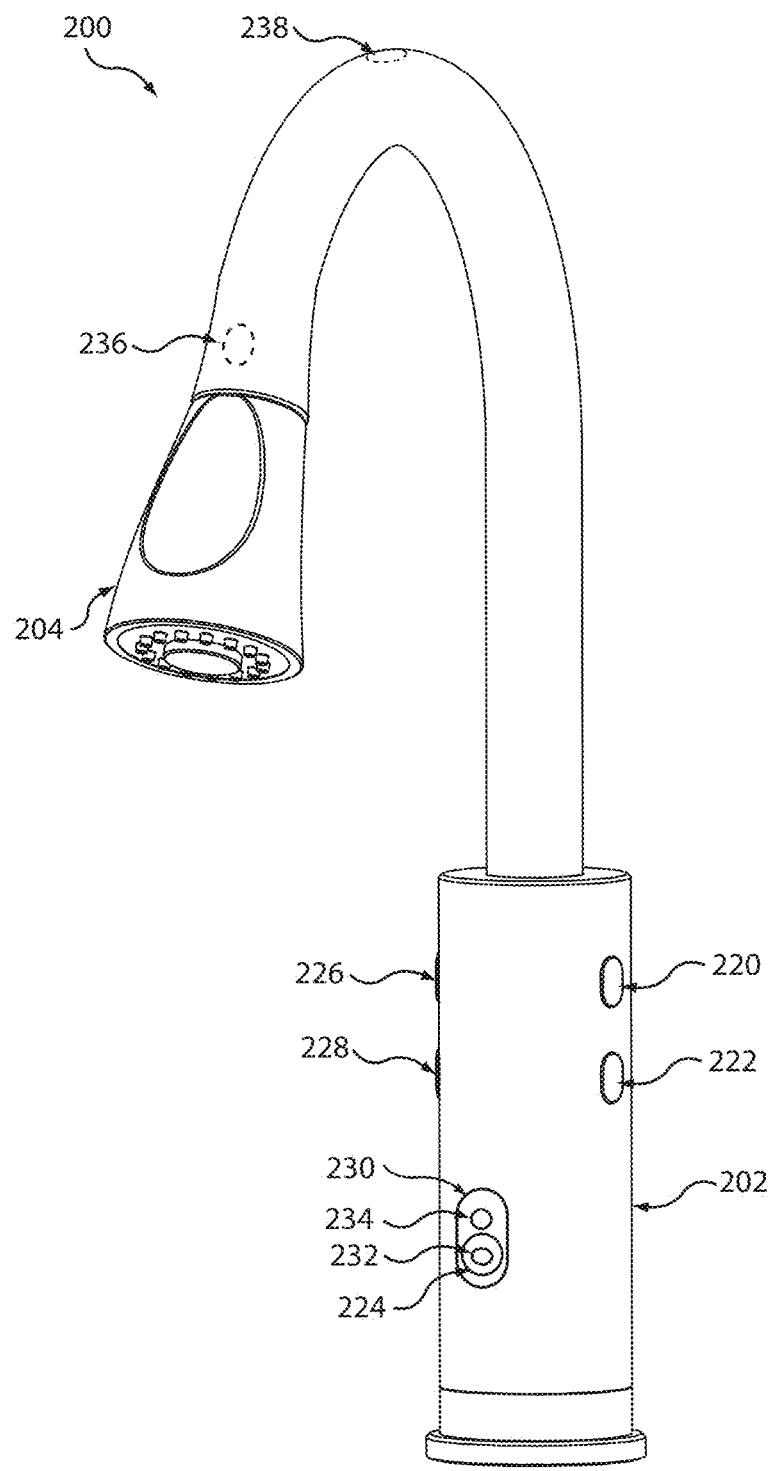
FIG. 2A illustrates an embodiment of a touch free faucet including one or more microphones and one or more sensors at various locations on the touch free faucet.

The touch free faucets disclosed herein can include a spout, a neck portion, and/or a base portion. The spout can be extendable or be a "pull-out" spout. Alternatively, the spout can be not extendable, but rather is an outlet located at an end of the touch free faucet. The base portion can be the portion of the touch free faucet that is closest to the surface upon which the touch free faucet is mounted to or supported by, for example, a kitchen counter near a sick or a bathroom counter near a bathroom sink. The neck portion can be between the spout and the base portion, and can be partially curved (for example, can be curved such that the spout of the touch free faucet faces in a downward direction towards a sink region). In some embodiments, the base portion includes a perimeter, width, and/or diameter different than the neck portion and/or spout. For example, the base portion can include a larger perimeter, width, and/or diameter than the spout and/or the neck portion. The touch free faucets disclosed herein do not require these three components, however. For example, in some embodiments, the touch free faucets disclosed herein can include a continuous structure, without an extendable spout and/or without a base portion having a different perimeter, width, and/or diameter than the spout and/or neck portion. Such a continuous structure can be mounted to or supported by a surface near the touch free faucet (e.g., a kitchen sink) and can also be curved and/or oriented in different arrangements. In some embodiments, the touch free faucet includes a uniform and/or continuous cross section from a first end that is mounted to or supported by a surface (e.g., a bathroom sink) to a second end which is an outlet permitting water to flow out of the touch free faucet. As described herein, the one or more sensors and/or one or more microphones can be located in various locations on the touch free faucet, for example, on the spout, the neck portion, and/or the base portion. In some embodiments the touch free faucet has a rounded or cylindrical shape (for example, as shown in FIG. 2A). Such embodiments can have a front surface which includes a portion of the rounded or cylindrical perimeter that faces a basin area and can also have a back surface which includes a portion of the rounded or cylindrical perimeter that faces away from the basin area. Such embodiments, and others, can have other surfaces that face away, or toward, the basin area, such as a top surface on a neck portion of the touch free faucet. In some embodiments, the touch free faucet includes a non-round shape such as a rectangular shape. For example, a touch free faucet can have one or more microphones located on a front surface facing the basin area which is flat, and/or one or more microphones located on a back surface facing away from the basin area which is flat.

FIG. 1A illustrates a wireless computing environment 10 including networked computing devices 62, 64, 66, 72, 74, and 76 that can be programmed to communicate with each other and/or a touch free faucet 22. In some embodiments, one or more of the networked computing devices in group 60 (e.g., 62, 64, and 66) communicate with the touch free faucet 22 directly using wireless communication protocols, such as those discussed herein. The networked computing devices in group 70 (e.g., 72, 74, and 76) can communicate with the touch free faucet 22 via the networked computing devices in group 60, such as a wireless router and/or a smart hub 66. As illustrated in the FIG. 1A, a user can control the operation of the touch free faucet 22 using the networked computing devices. For example, a user can speak a voice command 68 and/or 78 to the networked computing devices, which can translate the spoken command into instructions for transmittal to the touch free faucet 22. The user can also input a command using a graphical user interface or hardware buttons of the networked computing devices, and the network computing devices can then communicate with the touch free faucet 22 to accomplish various operations. Wireless communications 92, 94, and 96 graphically represent the wireless signals that can be transmitted and/or received by networked computing devices in group 70, networked computing devices in group 60, and the touch free faucet environment 20 and touch free faucet 22.

In some embodiments, the networked device computing devices in group 60 includes Amazon® Alexa™ 62 and/or Google® Home Hub 64, Amazon® Echo Dot™ Wink, Samsung® Smart Hub®, or other hubs (not shown). The networked computing devices in group 70 (e.g., 72, 74, 76) can include a smartphone, a desktop computer, a portable computing system (e.g., laptop or tablet) or any other computing system capable of wireless communications.

Communications between device group 60 and 70 can be through communication links 82 and 84. The communication links 82 and 84 can include wireless or wired networking protocols. Example protocols include Wi-Fi, Bluetooth, ZigBee, Z-wave, or radio frequency such as near field communication. The communication links 82 and 84 can also include other protocols such as cellular telephony infrared, satellite transmission, proprietary protocols, combinations of the same, and the like. In some embodiments, the communication links 82 and 84 can be between the networked computing devices in group 70 and the touch free faucet environment 20 including the touch free faucet 22. For example, in some embodiments, the networked computing devices in group 70 can communicate directly with touch free faucet environment 20 to control various operations of touch free faucet 22.

Communications between device group 60 and the touch free faucet environment 20 including the touch free faucet 22 can be through communication link 86 and 88. The communication links 86 and 88 can include wireless or wired networking protocols, such as those described above.

The faucet 22 can include one or more touch free sensors that have sensor zones such as the sensor zones 24 and 26 that can detect a presence of an activation motion 30 of a user. For example, the faucet 22 can include one, two, three, four, five, six, or seven or more touch free sensors. The faucet 22 can also include one or more microphones 28 that can detect one or more sound signals from the user when the user issues a voice command 32. For example, the faucet 22 can include one, two, three, four, five, six, seven, or eight or more microphones 28. The activation motion 30 and/or the sound signals 32 can be processed by a logic processor to control the operation of the faucet 22. In some embodiments, the control of operations of the touch free faucet 22 are divided between voice control and motion control. For example, during preparation of a meal, it can be cumbersome for a user to give voice instructions to turn on and off a faucet and in those situations motion activation can be advantageous. After the water flow is turned on, voice command can be more efficient in some instances for changing water flow, or water temperature, or initiating a continuous mode (e.g., a mode allowing continuous water flow until the touch free faucet receives input from a user instructing the continuous flow to stop), or pause mode (e.g., a mode allowing a sensor to be temporarily turned off or to not respond to activation signals by a user), or changing and/or creating presets (e.g., creating a first preset that turns on two sensors on the faucet and turns off the one or more microphones on the faucet). Accordingly, in some embodiments, users can select how the operations are controlled through either voice and/or motion commands. In one embodiment, a single sensor can be used for intermittent water flow and additional operations can controlled with voice commands. The single sensor can also be used to initiate a continuous mode if motion is detected by the sensor for an extended period of time. In another embodiment, the faucet 22 can include two sensors for motion based commands and one or more microphones and/or wireless receivers for non-motion based commands. The one or more microphones 28 can be located in various areas of the faucet 22. The processes, systems, components, and/or features described with reference to FIG. 1A can be incorporated or utilized with, in whole or in part, with the touch free faucets and/or control consoles/module described herein.

Figure 1B:
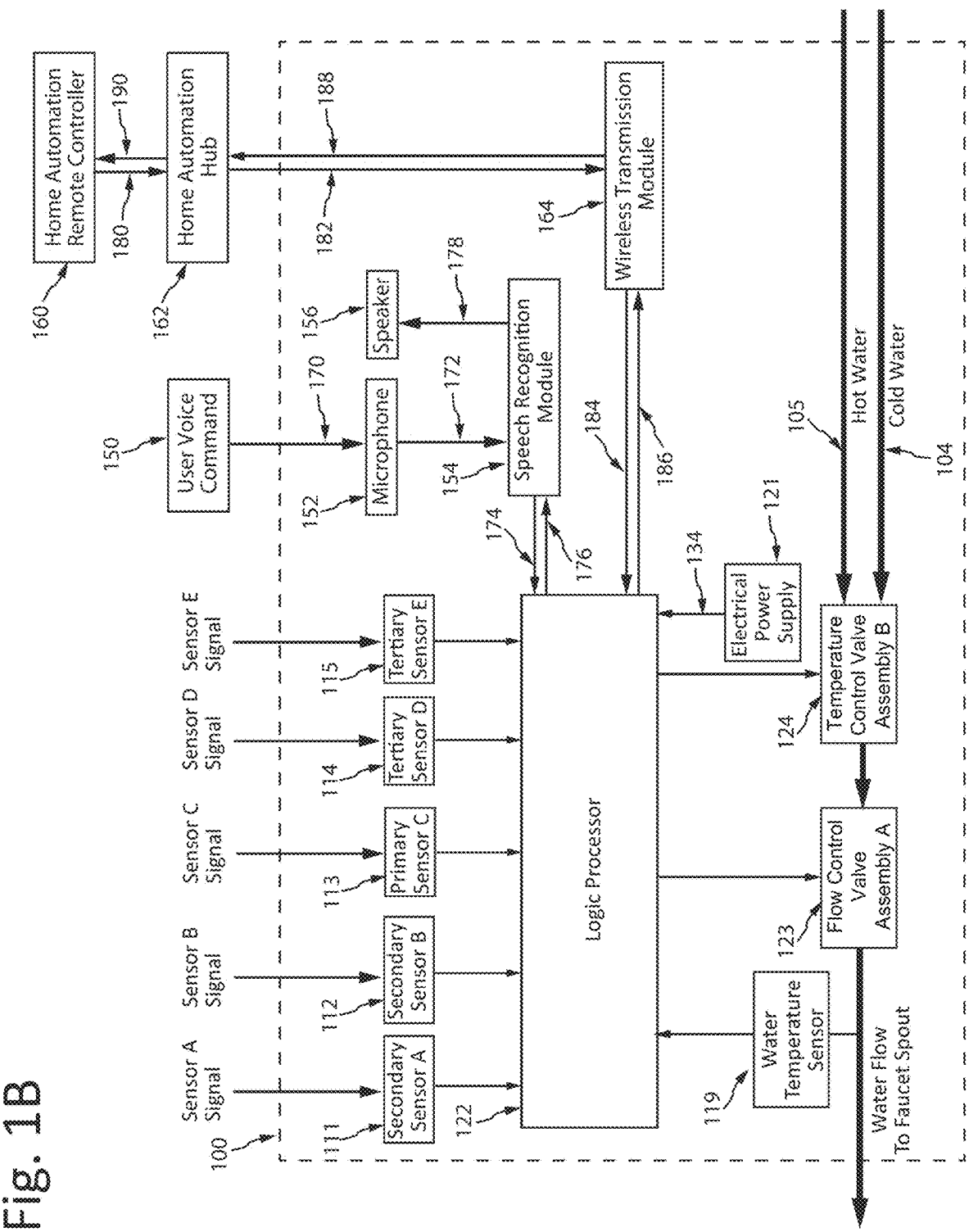
FIG. 1B illustrates a block diagram of an embodiment of a system for controlling operation of a touch free faucet.

FIG. 1B illustrates a block diagram of an embodiment of a system for controlling operation of a touch free faucet. In the illustrated embodiment, a logic processor 122 is programmed to receive signals from five touch free sensors, 111, 112, 113, 114, and 115 as described more in detail in U.S. Pat. No. 9,347,207 to Chen which is incorporated by reference in its entirety herein. Not all of the five sensors are necessary. For example, as discussed above, the touch free faucet can include less than five sensors, such as one, two, three, or four sensors. Alternatively, the touch free faucet can include more than five sensors, such as six, seven, eight, nine, ten, or eleven or more sensors. In some embodiments, the logic processor 112 can be programmed to control operation of the faucet 22 with one or two sensors as discussed above. The system can include a speech recognition module 154 and/or a wireless transmission module 164. The speech recognition module 154 can include instructions that can be implemented and executed by the logic processor 122. The speech recognition module 154 can analyze signals received from a microphone 152 and transform these signals to instructions to control a flow control valve 123 and/or a temperature control valve 124. The Logic Processor 122 can receive power from an Electrical Power Supply 121 via a wired connection 134.

The following is an embodiment of a process for analyzing a sound signal using the touch free faucet according to FIG. 1B. The processes, systems, and/or components described with reference to FIG. 1B can be incorporated, in whole or in part, with the touch free faucets and/or control consoles/module described herein. The Microphone 152 on the touch free faucet can receive a voice signal 170 from a User Voice Command 150. The microphone 152 can transmit a voice analog electronic signal 172 to a Speech Recognition Module 154 in the faucet unit 100. The Speech Recognition Module (speech to text recognition) 154 can convert the analog electronic voice signal 172 to digital text format and transmit 174 to a Logic Processor 122 to activate a Flow Control Valve Assembly A 123 and a Temperature Control Valve Assembly B 124 to control a Hot Water flow 105 and a Cold Water Flow 104 to a desired water flow condition. Water flow and/or temperature conditions and control valve operating conditions can be transmitted 176 to the Speech Recognition Module 154 and transmitted 178 to a Speaker 156, which can emit an audio confirmation sound or phrase. Thus, the faucet unit 100 can confirm the change in water flow and/or temperature conditions by communicating through the Speaker 156.

As illustrated in FIG. 1B, a user can use a Home Automation Remote Controller 160 to remotely control operations of the faucet unit 100. The Remote Controller 160 can be a keyboard, a wall-mounted keypad in a bedroom or via Internet connected smart phone/tablet/computer or other computing device from anywhere in the world. The Remote Controller 160 can transmit a wired or wireless signal 180 to a Home Automation Hub 162 such as Amazon Echo®, Google® Home, Apple® HomeKit™, Microsoft® Insteon® Hub, and other smart home automation hubs such as Lowe's® Iris, MiCasaVerde Vera™, and/or intelligent robots such as Kuri, Misty, Jibo®, Sanbot Nano, Keecker, Lego® Boost, Hexa, Sphero Mini™, and others. The wired or wireless signal 180 can include a variety of wireless technologies such as Wi-Fi, Bluetooth, ZigBee, Z-wave, or radio frequency such as near field communication, or other protocols such as cellular telephony, infrared, RFID, satellite transmission, proprietary protocols, combinations of the same, and the like. For example, the wired or wireless signal 180 can allow a user to transmit an instruction to the Home Automation Hub 162 to turn a faucet unit 100 on while the user is outside a home about to enter the home. Some Home Automation Hubs 162, such as Amazon Echo®, Google® Home, Apple® HomeKit™ are also equipped with a speaker and a microphone for voice command function to convert voice command into a digital instruction signal 182. The digital instruction signal 182 can be transmitted from the Home Automation Hub 162 via a wireless transmission protocol such as X10, Bluetooth, Wi-Fi Ethernet, ZigBee, Z-Wave, or other radio frequency transmission media, or cellular telephony, infrared, satellite transmission, proprietary protocols, combinations of the same, and the like, to the Wireless Transmission Module 164 of the faucet 100. The Home Automation Hubs 162 can also transmit a text signal to a connected server or cloud-based server to convert a text command 182 to activate the faucet unit 100.

As illustrated in FIG. 1B, a Wireless Transmission Module 164 can transmit a digital signal 184 to a Logic Processor 122 to activate the Flow Control Valve Assembly A 123 and/or the Temperature Control Valve Assembly B 124 to control Hot Water flow 105 and/or Cold Water Flow 104 to a desired water flow and/or water temperature condition.

In some embodiments, the status of the one or more sensors included in the faucet unit 100 (Sensor A 111, Sensor B 112, Sensor C 113, Sensor D 114, Sensor E 115) and Water Temperature Sensor 119, Flow Control Valve Assembly A 123, Temperature Control Valve B 124 can be received by the Logic Processor 122 and transmitted from the Logic Processor 122 to the Wireless Transmission Module 164 via signal 186. The signal 186 can be then transmitted to the Home Automation Hub 162 using a wireless protocol 188 such as X10, Bluetooth, Wi-Fi Ethernet, ZigBee, Z-Wave, or other radio frequency transmission media, or cellular telephony, infrared, satellite transmission, proprietary protocols, combinations of the same, and the like, and accordingly transmitted to user's Home Automation Remote Controller 160 via a wired and/or wireless protocol 190, such as that listed above.

A Speech Recognition System (not shown) can include the Microphone 152, Speech Recognition Module 154, the Speaker 156, and the Wireless Transmission Module 164. The Speech Recognition System can independently operate without the one or more sensors in the faucet unit 100. For example, the Speech Recognition System can control various operations of the faucet unit 100 without interaction or inclusion with the one or more sensors.

Location of the Microphone

Figure 2B:
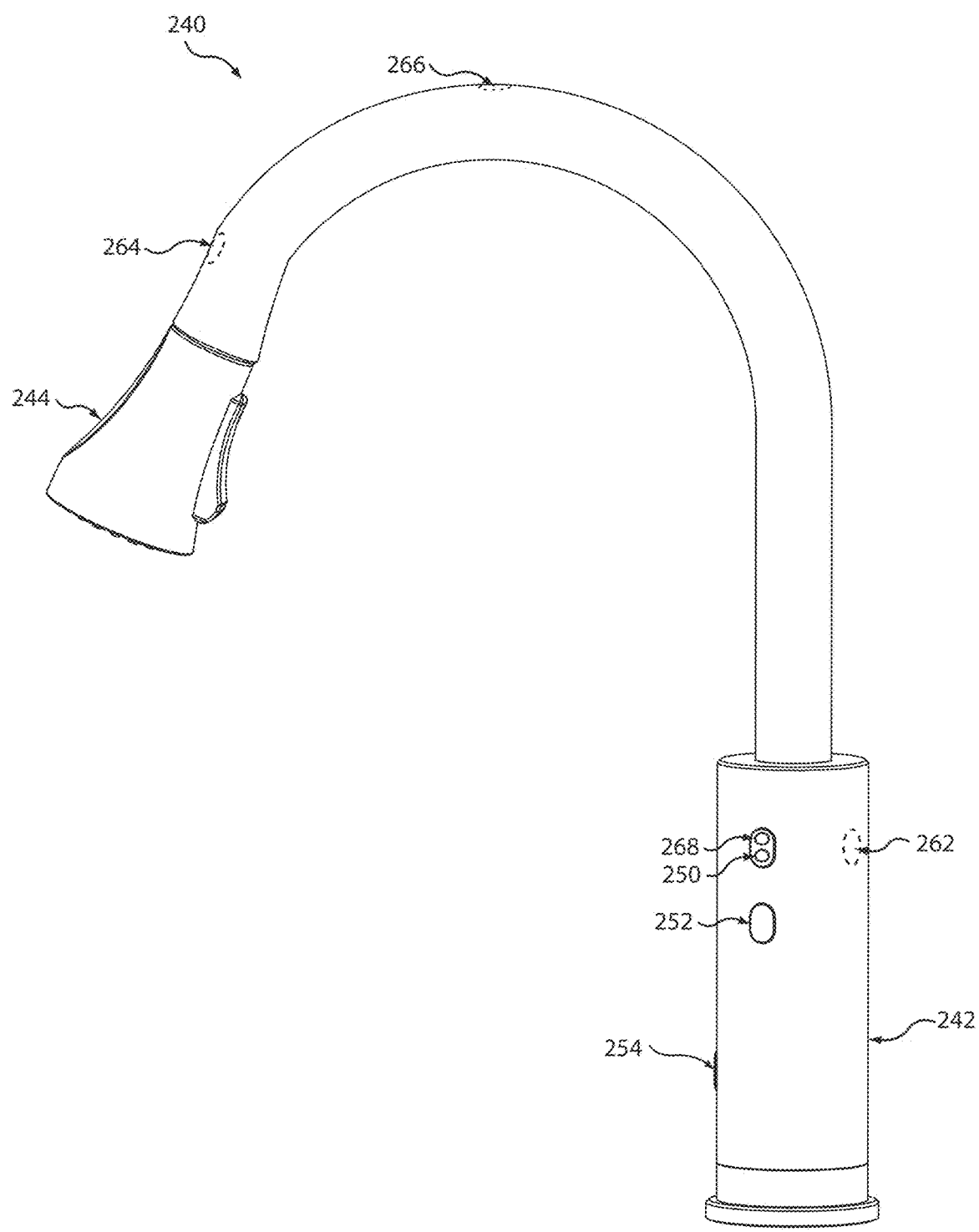
FIG. 2B illustrates an embodiment of a touch free faucet including one or more microphones and one or more sensors at various locations on the touch free faucet.
Figure 2C:
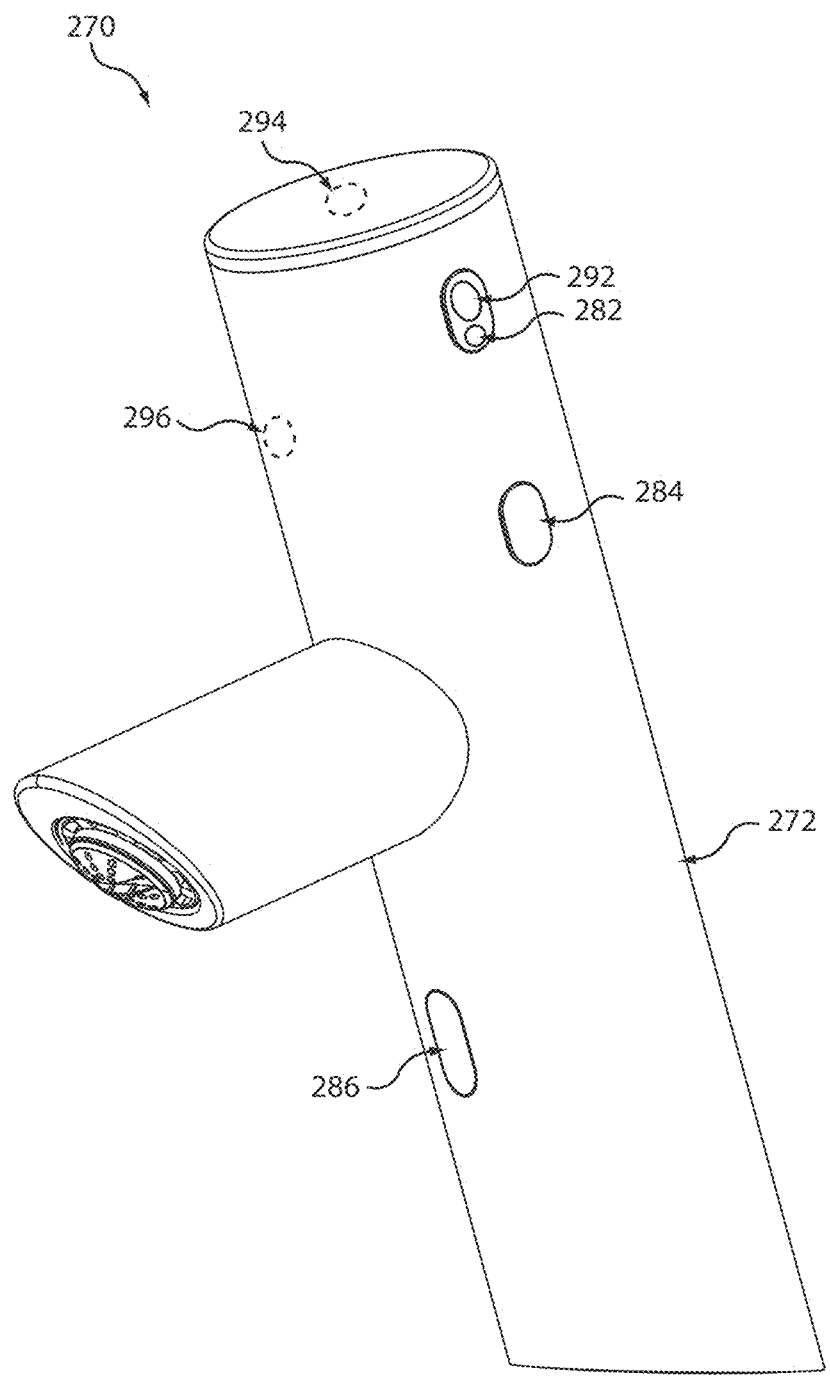
FIG. 2C illustrates an embodiment of a touch free faucet including one or more microphones and one or more sensors at various locations on the touch free faucet.

FIGS. 2A, 2B, and 2C illustrate embodiments of a touch free faucet including one or more microphones (which can include one, two, three, or four or more microphones) at various locations on the touch free faucet. The one or more microphones can be positioned in various locations on the touch free faucet, such as on the front, back, side, or top of the touch free faucet. As discussed above, the touch free faucet can include one or more sensors, such as one, two, three, four, five, six, seven, or eight or more sensors. The touch free faucet can also include one or more LED indicators, such as one, two, three, four, five, six, seven, or eight or more LED indicators.

FIG. 2A illustrates a touch free faucet 200 including a base portion 202, a sensor A 220, a sensor B 222, and a sensor C 224 with an LED indicator 232, sensor D 226, and sensor E 228. The faucet 200 can further include a pull-out spout 204. In the illustrated embodiment, the touch free faucet 200 includes a microphone 234 located on a front portion of the faucet spout body 202 proximate to sensor C 224. Alternatively, the microphone 234 can be located on a top portion of the touch free faucet 200, such as on a neck portion of the touch free faucet 200 at a location 238. Alternatively, the microphone 234 can be located on a front portion of the touch free faucet 200, such as on a neck portion of the touch free faucet 200 at location 236. As discussed above, the touch free faucet 200 can include one or more microphones 234 at various locations on the touch free faucet 200, such as at locations 236, 238, 234, and/or other locations. In some embodiments, the touch free faucet 200 includes a microphone 234, an LED indicator 232, and a sensor 224 (such as sensor C) in a region 230. In some embodiments, region 230 can be recessed from, or alternatively can protrude from, a top surface of the base portion 202. In some embodiments, region 230 is not recessed from nor protruding from the top surface of the base portion 202. In some embodiments, having the microphone on a top portion, back or rear portion of the touch free faucet 200 (such as 238 and/or 236) can reduce the likelihood or amount of water contacting the microphone or nearby areas. Further, having the microphone on a top portion, back or rear portion of the touch free faucet 200 can also reduce the level of interference from the sound of water flow. Minimizing such interference can advantageously permit the one or more microphones to more easily distinguish between sounds resulting from water flow from the touch free faucet 200 and other sounds (e.g., voice commands by a user) and/or more readily detect such other sounds. As discussed above, the touch free faucet 200 can include one microphone 234 that can detect a range of sound signals and/or frequencies and/or distinguish between sounds resulting from water flow and other sounds. As also discussed above, the touch free faucet 200 can alternatively include more than one (e.g., two, three, four, or more) microphones 234 that can be used to detect a range of sound signals and/or frequencies and/or distinguish between sounds resulting from water flow and other sounds.

FIG. 2B illustrates an embodiment of a touch free faucet 240 including a base portion 242, a spout 244 (which can be extendable) a sensor A 250 proximate to a microphone 268, a sensor B 252, and a sensor C 254. Optionally, the microphone 268 can be installed on a rear side location 262 of the base portion 242, on a neck portion of the touch free faucet 240 such as location 264, and/or on a neck portion of the touch free faucet 240 at a location 266. As discussed above, placing the microphone 268 in locations on the touch free faucet 240 away from areas proximate to the water flow or areas where the water contacts can reduce the likelihood that the microphone 268 gets splashed by water and can also reduce the level of water flow noise received by the microphone 268. As discussed above, the touch free faucet 240 can include more than one microphone 268, such as one, two, three, or four or more microphones. Further, the one or more microphones 268 can be located in different positions on the touch free faucet 240. Additionally, the touch free faucet 240 can include less than three sensors, such as one or two sensors, or can have more than three sensors, such as four, five, or six or more sensors. The one or more sensors can be used to carry out different operations of the touch free faucet. For example, a Sensor C 254 can be used to pace the faucet into a continuous flow mode and the Sensor A 250 can be used to place the faucet into a primary flow mode or a time flow mode (e.g., can trigger water flow for a 5 second period).

FIG. 2C illustrates another embodiment of a touch free faucet 270 including a faucet spout body 272, a sensor A 282, a microphone 292, a sensor B 284, and a sensor C 286. Similar to other embodiments previously described, the microphone 292 can be positioned at various locations on the touch free faucet 270, such as on a top portion of the touch free faucet 270 at location 294, and/or on a front portion of the touch free faucet 270 at location 296. As discussed above, the touch free faucet 270 can include more than one microphone 292, such as one, two, three, or four or more microphones. Further, the one or more microphones 292 can be located in different positions on the touch free faucet 270. Additionally, the touch free faucet 270 can include less than three sensors, such as one or two sensors, or can have more than three sensors, such as four, five, or six or more sensors. As discussed above, placing the one or more microphones 292 in locations on the touch free faucet 270 away from areas proximate to the water flow or areas where the water contacts can reduce the likelihood that the one or more microphones 292 get splashed by water and can also reduce the level of water flow noise received by the one or more microphones 292.

Smart Integration

Figure 3:
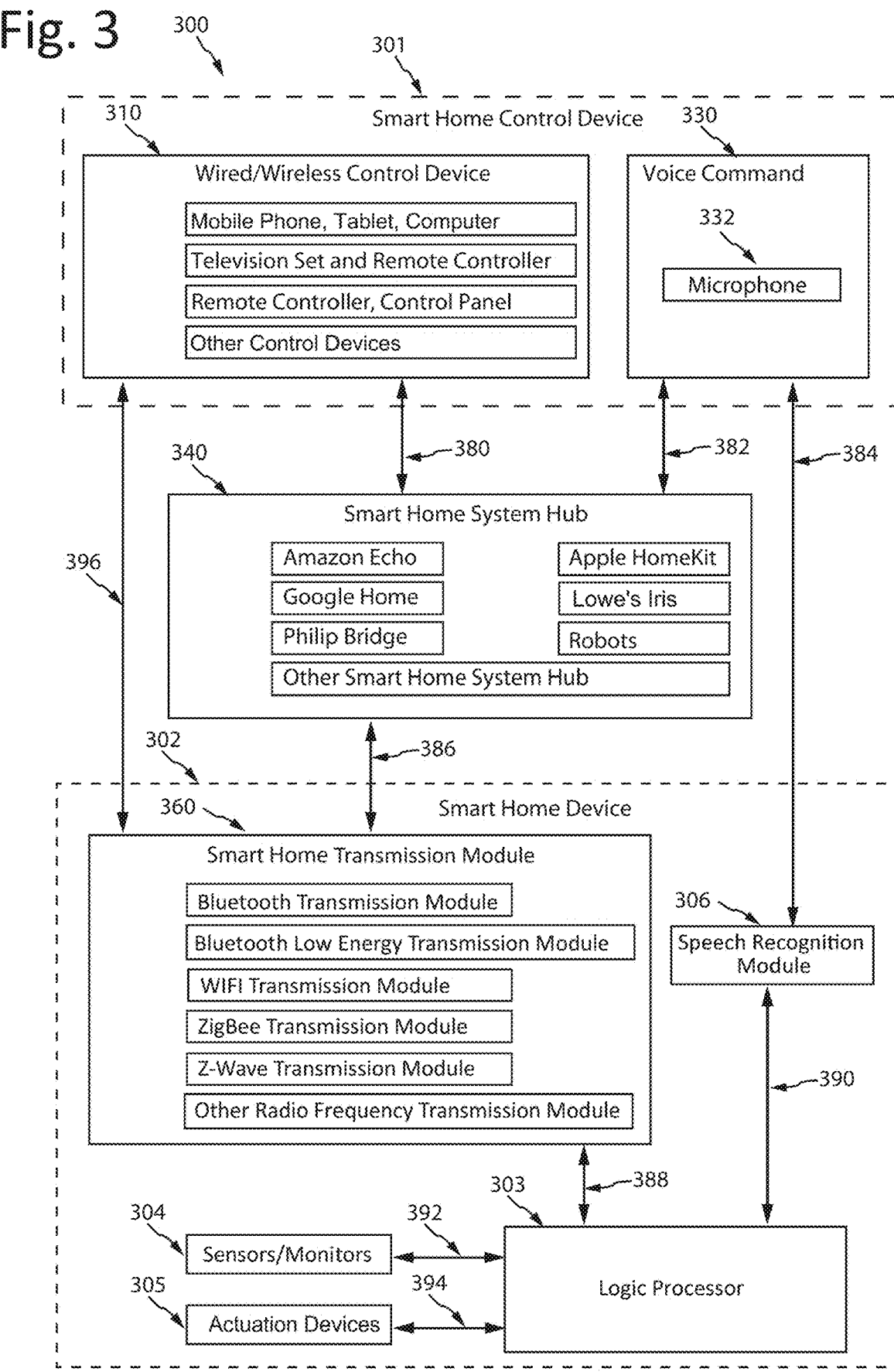
FIG. 3 illustrates a block diagram of an embodiment of a network system for controlling operation of a touch free faucet.

FIG. 3 illustrates a block diagram of an embodiment of a network system 300 for controlling operation of a touch free faucet. This networked system 300 in whole or in part can be incorporated or utilized with the touch free faucets and/or control consoles/modules discussed herein. In an embodiment, a Wired/Wireless Control Device 310 and a Smart Home System Hub 340 can be linked using a communication link 380. In some embodiments, a Wired/Wireless Control Device 310 can bypass the Smart Home System Hub 340 and communicate directly with a Smart Home Device 302 via a communications link 396. The Wired/Wireless Control Device 310 can be a mobile phone, tablet, computer, televisions set and remote controller, remote controller, control panel, and/or another control device. The Wired/Wireless Control Device 310 can utilize a software application that enables the Wired/Wireless Control Device 310 to communicate with and/or across the networked system 300. The Smart Home System Hub 340 can be Amazon Echo®, Google® Home, Apple® HomeKit™, Microsoft® Insteon® Hub, and other smart home automation hubs such as Lowe's® Iris, MiCasaVerde Vera™, and/or intelligent robots such as Kuri, Misty, Jibo®, Sanbot Nano, Keecker, Lego® Boost, Hexa, Sphero Mini™, and others.

The communication links 380, 382, 384, 386, and 396 can include wireless or wired networking protocols. Example protocols include Wi-Fi, Bluetooth, Bluetooth Energy signal, ZigBee, Z-wave, or radio frequency such as near field communication. The communication links 380, 382, 384, 386, and 396 can also include other protocols such as cellular telephony, infrared, RFID, satellite transmission, proprietary protocols, combinations of the same, and the like. The communication links 380, 382, 384, 386, and 396 can be activated using an API, software, or a program. The communication links 380, 382, 384, 386, and 396 can be used to transmit a user command to a Smart Home System Hub 340 and/or a Smart Home Device 302. Further, signals from the Sensors/Monitors 304 of Smart Home Devices 302 can be monitored from the Wired/Wireless Control Devices 301 via communications links, such as communication link 396.

In some embodiments, a user's Voice Command 330 can be received by a Microphone 332 of a Smart Home Control Device 301 and/or the Smart Home System Hub 340 and then transmitted to a Smart Home Transmission Module 360 and/or the Speech Recognition Module 306.

In some embodiments, the Smart Home Device 302 is a touch free faucet that can receive communications from the Smart home Control Device 301 and/or the Smart Home System Hub 340. A microphone of the touch free faucet can also receive a user's voice command and relay it to a Speech Recognition Module 306, which can convert an analog voice signal to a digital text format command. The converted digital text format command can then be transmitted via the link 390 to a Logic Processor 303 to activate Sensors/Monitors 304 and/or actuate Actuation Devices 305 such as mechanical valves to control water flow and/or temperature of the touch free faucet. The Logic Processor 303 can communicate with the Actuation Devices 305 via wired or wireless communication links 394. In some embodiments, the Speech Recognition Module 306 can have its own logic processor with a language library and the Smart Home Transmission Module 360 can include its own logic processor to process a protocol transmission. In some embodiments, communications received from the Smart Home Transmission Module 360 can be transmitted or communicated to the Logic Processor 303 via link 388.

The Sensors/Monitors 304 can send sensing signals 392 to the Logic Processor 303. The Logic Processor 303 can send a voice signal to a speaker in the faucet, or the Smart Home System Hub 340, or the Smart Home Control Device 301.

The Smart Home System Hub 340 can include a security alarm panel, a Philips Hue Bridge, a Lowe's Iris, and/or a Microsoft InsteOn. The Hub 340 can be connected to the network with Wi-Fi, for example. In some embodiments, the Microphone 332 can receive a voice command, for example a voice question 330, and can transmit such voice question 330 over the network to an external computer to search for an answer, and then the external computer can transfer back an answer to voice question to a speaker in the Hub 340. In some embodiments, the Smart Home System Hub 340 can include a Robot 352, such as Kuri, Misty, Jibo, Sanbot Nano, Keecker, Lego Boost, Hexa, Sphero Mini, and/or others. The Wired/Wireless Control Device 310 and/or the Smart Home System Hub 340 can utilize various software and/or applications, such as IFTTT applets, which are web-based platforms used to develop chains of conditional statements also compatible with iOS and Android. Such platforms can be employed to create various tasks or actions that can be triggered when certain events occur. For example, the Smart Home System Hub 340 and/or the Wired/Wireless Control Device 310 can include or utilize an IFTTT applet to create a task of "Automatically turning off a faucet" (such as the touch free faucet) when no voice command has been received and/or no activation signal has been received by the one or more sensors of the touch free faucet. Other tasks can be created and integrated into the network system 300, the Smart Home System Hub 340, and/or the Wired/Wireless Control Device 310.

The network system 300 disclosed herein can be utilized to control operation of one or more faucets in an environment. For example, a user can utilize the network system 300 to control operation of one or more faucets in a home. The Wired/Wireless Control Device 310 can be used to manage such one or more faucets. For example, a mobile phone, tablet and/or a computer can be used by a user to visualize all of the faucets in a home, and a user can create identifiers for each faucet in the home in order to control particular or group faucet operation. As discussed above, the Smart Home Device 302 of FIG. 3 can be a touch free faucet. Thus, in some embodiments, the Smart Home Control Device 301 can be a mobile phone with an application that enables the one or more faucets in a home to be visualized, monitored, and/or controlled. In such embodiments, a user can use the mobile phone and the application to change the identifiers of the faucets (e.g., program voice commands to match up with particular faucets or groups of faucets) and/or change other properties of the networked system 300 of one or more faucets (e.g., program all the faucets to turn off and enter a sleeping mode if no voice command is received or movement sensed by sensors). One skilled in the art can also recognize that the networked computing devices and networked system discussed herein can be utilized to perform other operational, management, or other tasks involving the one or more faucets.

Figure 4:
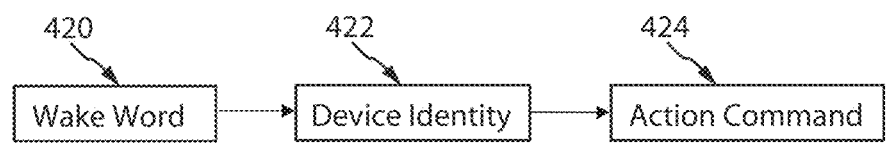
FIG. 4 illustrates example voice commands to control operation of the touch free faucet.
Figure 4:
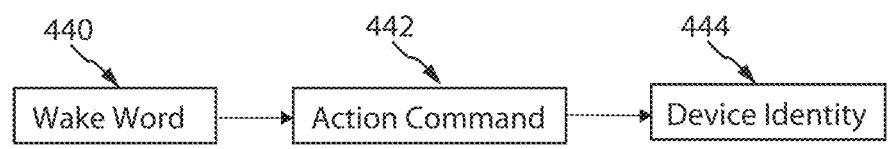

FIG. 4 illustrates examples of voice commands that can be used to control operation of the touch free faucet. It is recognized that in some environments, a user may need to control operations of one or more faucets, such as one, two, three, four, five, six, or seven or more faucets in some environments (e.g., a home or office). Accordingly, each of the one or more faucets can include an identification data. The identification data can be used with the networked devices described above to control aspects of a particular faucet or a group of faucets. For example, a faucet can come manufactured with a preset device identity (e.g., "Faucet 1" or "Faucet A") and/or with an ability to re-program the device identity (e.g., a user can change a device's identity to something they prefer, such as "Master Bathroom Faucet 1"). Further, the touch free faucet can have a preset and re-programmable "Wake Word," which can be a voice command that can operate to bring the one or more faucets out of sleeping mode (a mode where the faucet does not respond to voice commands) and into a mode where the faucet can receive voice commands and respond by carrying out commands to control operation of the faucet. For example, a user can control operation of a faucet by saying a Wake Word 420 such as "Wake Up" or "Hello," then saying a Device Identity 422 such as "Kitchen Faucet", then saying an Action Command 424, such as "Turn On." Alternatively, a user can control operation of a faucet by saying a Wake Word 440 such as "Wake Up" or "Hello," then saying an Action Command 442, such as "Turn On," they saying a Device Identity 444 such as "Kitchen Faucet." Alternatively, a user can control operation of a faucet by saying a device identity first, then saying a wake word, and then saying an action command. In some embodiments, the faucet can receive the device identity as a voice signal, check whether such device identity matches its preset or programmed device identity, and if the identity does match, the faucet can wake up and/or respond to the action command.

In some embodiments, a faucet's device identity or name can be used to both reference a particular faucet and wake that faucet up, thus eliminating the need to have both a wake word and a device identity be received. For example, a user can simply say a phrase such as "Kitchen Faucet," and upon receiving such phrase including the device identity, a faucet can receive the phrase, check whether such phrase matches the faucet's device identity (e.g., by comparing the identity to the faucet's preset or programmed identity), and then wake up if the identity matches. Thus, in some embodiments, a user can be within a home environment and say "Kitchen Faucet," and only the faucets including that device identity (as a preset or a programmed identity) can wake up and enter an operation mode whereby the user can then say operational action commands, such as "Turn On" and/or "Enter Continuous Flow Mode," and/or "Turn On to 80 degrees." Another example includes where a user says a phrase that identifies and wakes up a desired faucet and instructs an operation, such as "Sink Faucet On", "Sink Faucet Temperature Up," "Sink Faucet Off," or "Island Faucet On."

One or more faucets in an environment can have a common device identity. For example, one or more faucets located in showers in a household can have a common identity, such as "Tub Faucets" which would allow a user to, upon entering or approaching the household, say a voice command instructing the one or more faucets including that common identifier ("Tub Faucets") to turn on and/or flow at a water flow rate and/or water temperature. Another example can include a situation where multiple users are entering or approaching a house and the multiple users would like to each take a shower upon entering the house. In this example, a user entering or approaching the house can say a voice command instructing one or more showers (e.g., shower heads) to turn on and begin allowing water to flow and/or begin adjusting to a desired/instructed temperature (thus making it so that when the multiple users get to the shower, the water has been started and, for example, is heated to an appropriate temperature). Other variations are possible, and one skilled in the art can recognize the ways in which the networked system disclosed herein can allow one or more faucets to be identified, woken up, and instructed to carry out operations. Thus, using the identification data and/or a Wake Word, a user can reference a particular faucet or groups of faucets in an environment and have a particular or groups of faucets wake up and carry out a command. One skilled in the art can also recognize that the networked computing devices discussed herein can be utilized to instruct a particular faucet or a group of faucets to carry out instructions.

In some embodiments, the one or more microphones of the touch free faucet can be in a passive state and transition to an active state to begin listening for user voice commands automatically when the touch free faucet is operated by one or more sensors. For example, the one or more microphones can transition to a listening state once a user moves an object or body part in front of a sensor. This can help conserve power and simplify user operation of the touch free faucet since a user may prefer to begin operations of the touch free faucet (such as turning the water on) using simpler, motion techniques, and may prefer to save user voice commands for more complex touch free faucet operations (such as changing the temperature or flow rate).

Figure 5A:
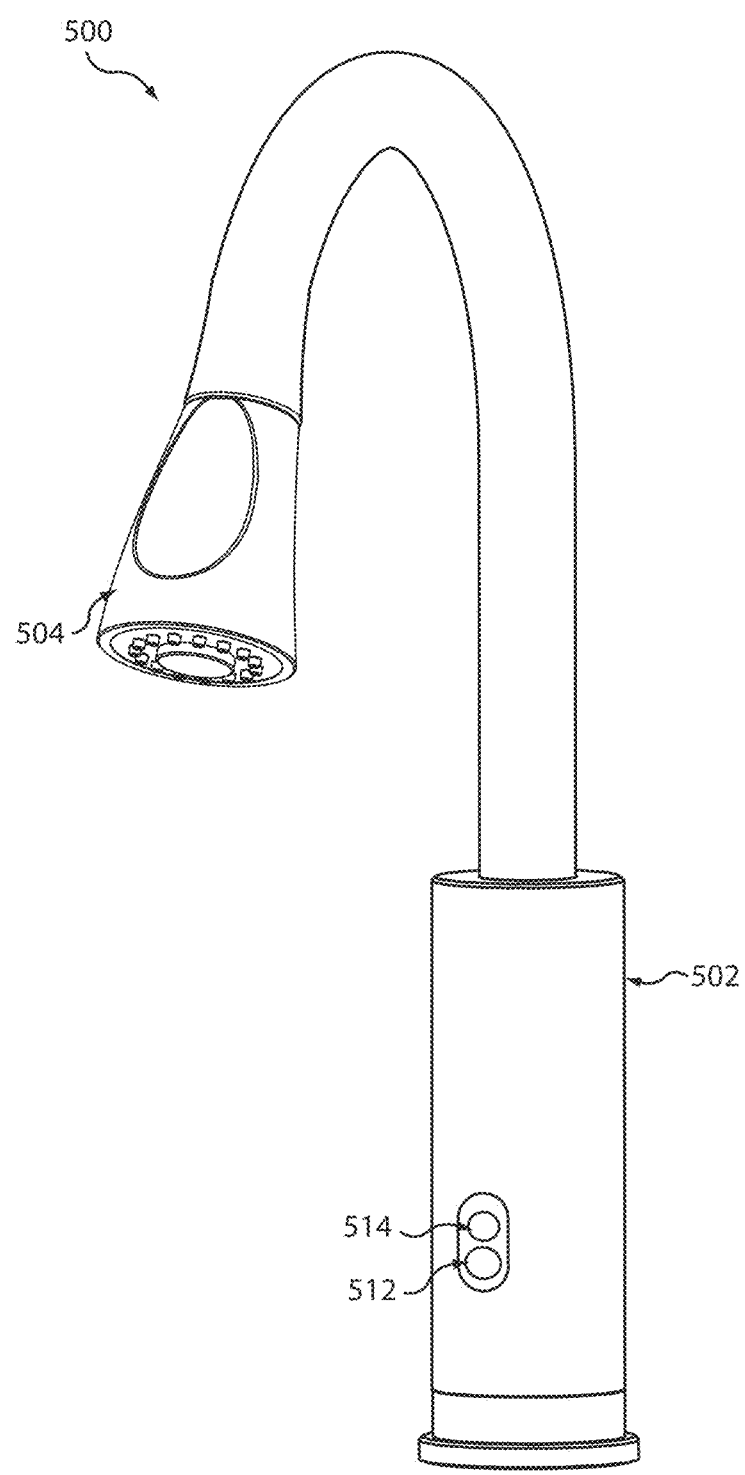
FIG. 5A illustrates an embodiment of a touch free faucet including a sensor and a microphone.

FIG. 5A illustrates an embodiment of a faucet 500 including a base portion 502, a spout 504, a sensor A 512 and a microphone 514. The sensor A 512 can be used to turn on and off water intermittently or to put the faucet 500 into continuous flow mode. A logic processor can be programmed with a preset to shut off water automatically after a period of time if a user forgets to shut off water in a continuous flow mode, for example, if the logic processor does not receive a signal from the sensor and microphone for a predetermined or preset period of time. This automatic water shut off function can also be set with the microphone 514 using a voice command. Voice commands can be used to carry out a number of functions, including but not limited to: turning water on or off; adjusting water temperature; adjusting water flow; saving a given water flow and/or temperature as a preset; disabling or pausing a sensor for a period of time, such as a time that a user would like to clean a faucet or nearby area; setting a water flow timer or automatic shut off time; and setting a maximum water flow temperature to control water temperature to prevent injury (e.g., setting a maximum temperature of 85 degrees in a bathroom primarily used by children or elderly). Voice commands can be used for other functions as well. As discussed above, since a majority of faucet operations involve simply turning on and off water, the sensor A can be programmed to trigger intermittent or continuous water flow modes when the sensor A detects motion in front of a sensor zone, and the remaining operations of the faucet 500 can be controlled entirely via voice commands. Thus, splitting up control of the faucet 500 in this fashion can reduce the number of sound commands that need to be issued by the user to control various operations of the faucet 500.

Figure 5B:
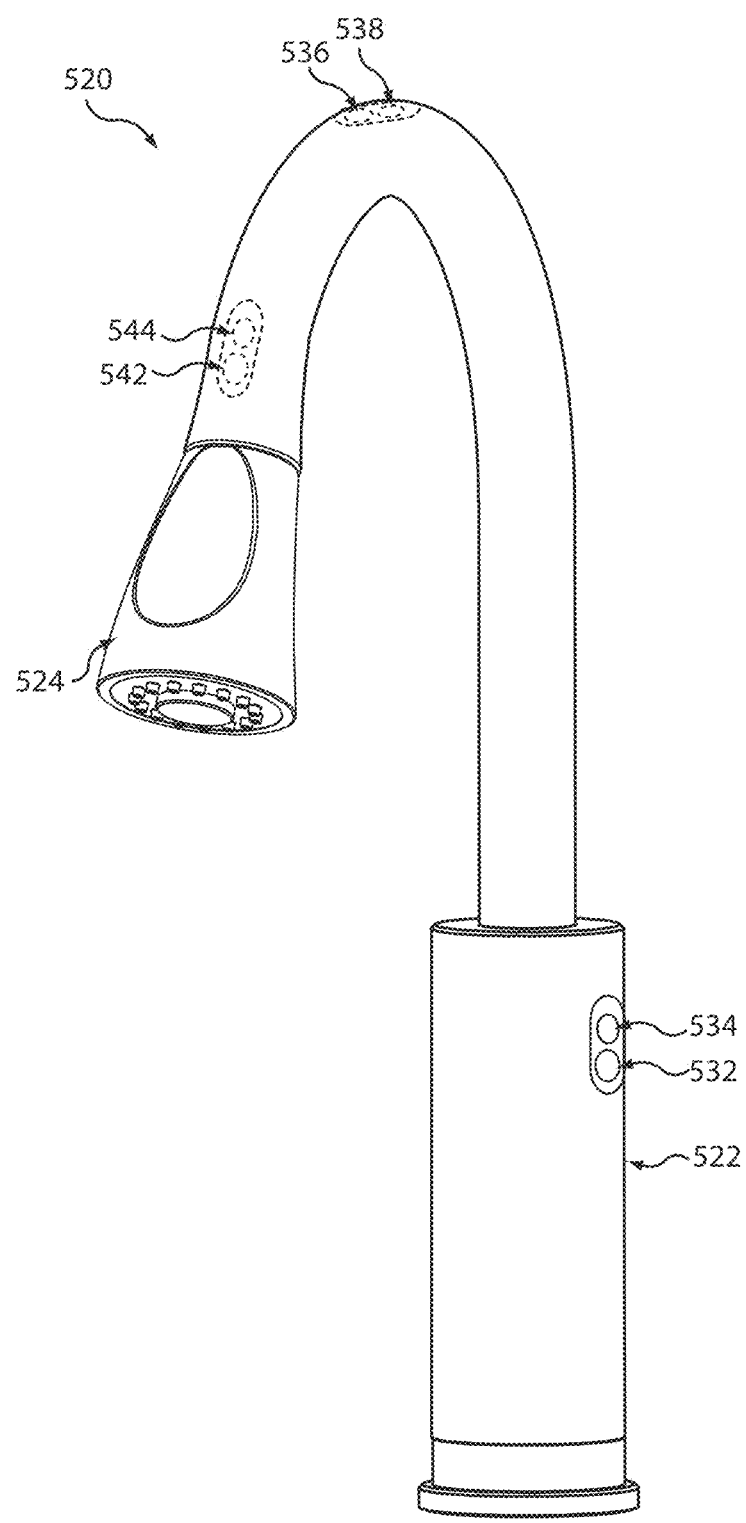
FIG. 5B illustrates another embodiment of the faucet of FIG. 5A and shows the various locations where the sensor and/or microphone can be located.

FIG. 5B illustrates another embodiment of a faucet 520 that can include a base portion 522, a spout 524, and one or more microphones and/or sensors. The one or more microphones and/or sensors can be located in various locations on the faucet 520, including but not limited to a top location, a bottom location, a rear location, a front location, or another location on the faucet 520. In some embodiments the faucet 520 can have a microphone proximate to a sensor, such as illustrated in microphone location 534 and sensor location 532, and microphone location 544 and sensor location 542 located on a neck portion of the faucet 520, and microphone location 538 and sensor location 536 located on a neck portion of the faucet 520. Placing one or more pairs of a microphone and sensor proximately together can be advantageous in aiding ease of use. For example, having a microphone close to a sensor minimizes the chance that a user will mistakenly move a hand or other body part or object in front of a microphone accidentally believing it to be a sensor.

Figure 5C:
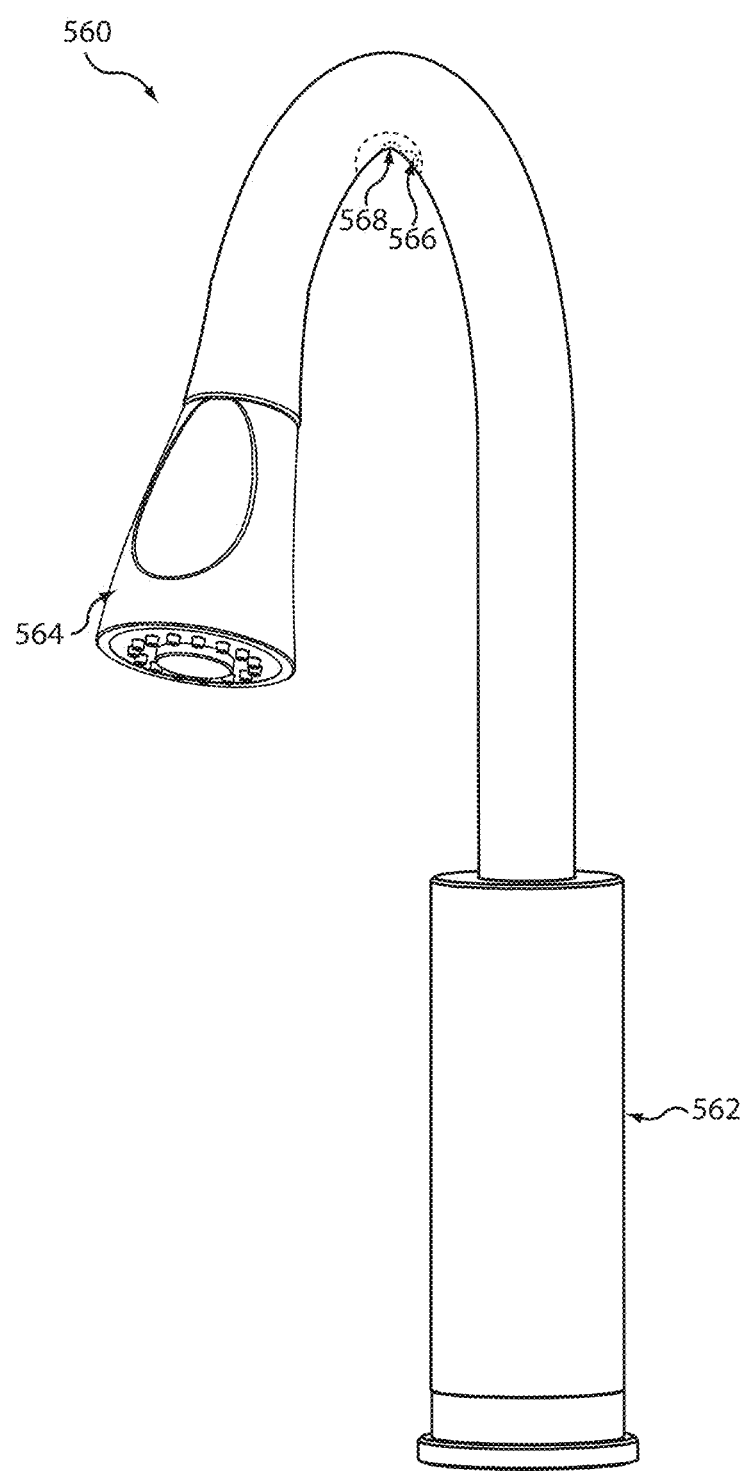
FIG. 5C illustrates another embodiment of the faucet of FIG. 5A and shows the various locations where the sensor and/or microphone can be located.

FIG. 5C illustrates another embodiment of a faucet 560 that can include one or more microphones and/or sensors. The one or more microphones and/or sensors can be located in various locations on the faucet 560, including but not limited to a top location, a bottom location, a rear location, a front location, or another location on the faucet 520. In some embodiments the faucet 560 can have a microphone proximate to a sensor, such as illustrated in microphone location 568 and sensor location 566. Placing one or more pairs of a microphone and sensor proximately together can be advantageous in aiding ease of use. For example, having a microphone close to a sensor minimizes the chance that a user will mistakenly move a hand or other body part or object in front of a microphone accidentally believing it to be a sensor. As illustrated in FIG. 5C, a faucet 560 can have a faucet body 562 and a faucet spout 564, and a microphone 568 and a sensor (such as an infrared sensor) 566, where the microphone 568 and the sensor 566 are located at a goose neck location on the faucet 560. The sensor 566 can be used for various operations involving the faucet 560, such as, turning the faucet on and off.

Figure 6:
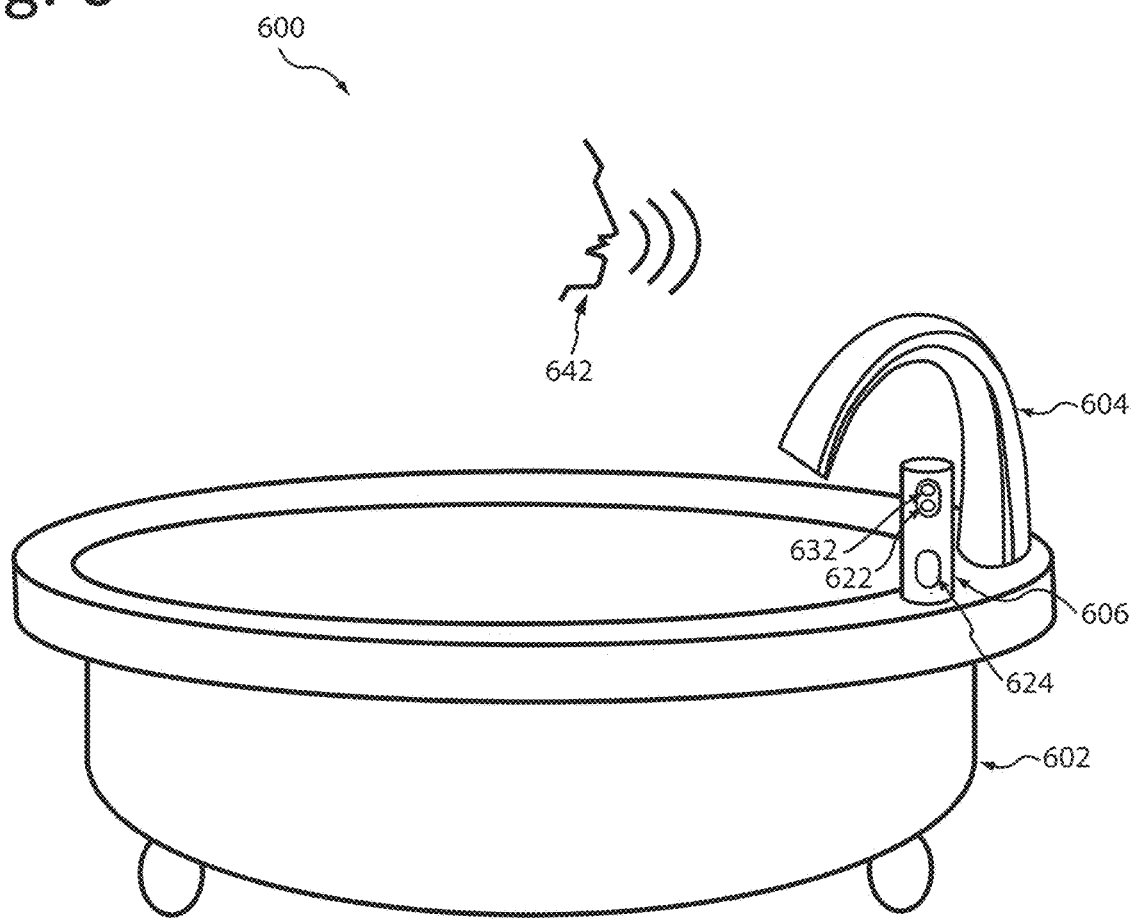
FIG. 6 illustrates a touch free faucet including voice control and sensor control in a bath tub.
Figure 6:
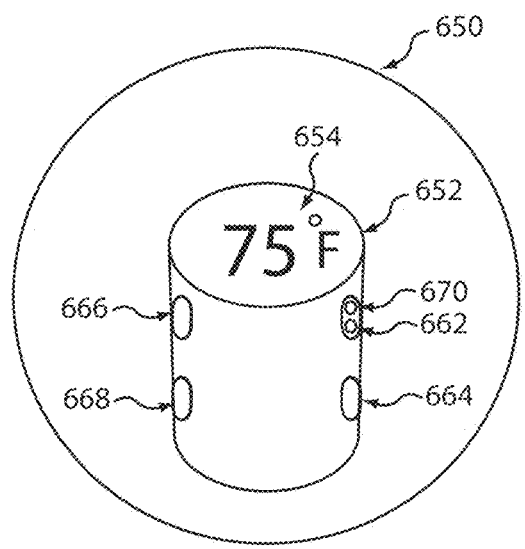

FIG. 6 illustrates a touch free faucet including voice control components and sensor control components in a bath tub environment 600. While FIG. 6 shows one touch free faucet on a right top rim portion of a tub, a tub environment 600 can have more than one touch free faucet with voice control operations and/or sensor control operations. For example, the tub environment 606 and/or the tub 602 can include two, three, four, five, six, or seven or more touch free faucets that can be located in various areas on or near the tub 602. A touch free faucet 604 can interact and/or communicate with a control console 606 that can include one or more microphones and/or one or more sensors. For example, the control console 606 can include one, two, three, four, five, six, or seven or more microphones. Further, the control console 606 can include one, two, three, four, five, six, or seven or more sensors. The one or more microphones and/or the one or more sensors can be located on various areas on the control console 606. The control console 606 can be unattached to the tub 602 and/or faucet 604. For example, the control console 606 can be movable and can be simply placed atop a portion of the tub 602, or a nearby area if a user so desires (e.g., a user may find that the control console 606 should be placed on a table stand nearby the tub 602). Alternatively, the control console 606 can be at least partially secured to the tub 602. For example, the control console 606 can be secured to the tub 602 and/or faucet 604 with an adhesive attachment or one or more suction cups disposed on a bottom portion of the control console 606, or the control console 606 can be secured to the tub unit and/or faucet with fasteners (e.g., brackets fastened with screws or bolts that mount the control console 606 to the tub 602). The control console 606 discussed with reference to FIG. 6 can be employed with other embodiments disclosed herein. For example, the control console 606 can be on or near a spout like the faucet 22.

The touch free faucet 604 can have one or more sensors and/or one or more microphones similar to other embodiments discussed herein. In some embodiments, the touch free faucet 604 can have a wireless or wired receiver or transceiver which can receive instructions from a networked computing device or hub. In some embodiments, the touch free faucet 604 can have no sensors and/or no microphones, and instead have a wireless or wired receiver or transceiver which can receive instructions from the control console 606. In some embodiments, for example, it can be advantageous to have a touch free faucet 604 that has no sensors so that such sensors do not get unintentionally triggered or utilized when a user is in the bath tub 602 within regions of the sensor zone or zones. Thus, having most if not all of the sensors be in the control console 606 can simplify operations of the faucet 604 and a user can find it convenient if the sensors are in one location (the control console 606) that can be movable or attached to an area on or nearby the tub. Further, it can also be advantageous to have the one or more microphones in the control console 606 as opposed to on the touch free faucet 604 to reduce splashing of the one or more microphones with water and interference noise of the water sounds (which can be more likely if the one or more microphones if on the faucet 604 as opposed to the control console 606 which can be further away from the water flow and/or water movement sounds).

In some embodiments, the control console 606 can include two sensors, such as a sensor A 622 and a sensor B 624, and a microphone 632. The control console 606 can be secured to or separated from the bath tub faucet spout 604. The control console 606 can control operations of the faucet 604 including but not limited to: adjusting water flow rate and/or temperature; defining a user preset of water flow and/or temperature (e.g., "Preset 1" could define a save setting where the water temperature is 90 degrees); defining a maximum water temperature permitted by the faucet 604; defining an automatic shut off feature (e.g., the faucet 604 turns off after 2 minutes unless a voice signal or motion signal is received by the control console 606); and defining a timed fill setting (e.g., "Four Minute Fill" can define a setting that permits water to flow into the tub for four minutes). A user can control such operations of the faucet 604 by issuing a voice command 642 to the control console 606 or by activating one or more sensors disposed on the control console.

The touch free faucet 604 can also have features that can be used to control or affect water flowing out of the faucet 604. For example, the touch free faucet 604 can have a sensor disposed on a spout surface (a surface of the faucet that points towards or faces the water surface in the tub) that can detect if the water level/surface in the tub is reaching a height that is too close to the tub rim, and automatically shut off the faucet 604 when such height is reached, for example, by communicating with the logic processor. The sensor disposed on such spout surface can have a preset and/or programmable (using, for example, the control console 606) sensor zone that can be used to detect whether the water level in the tub has reached a maximum height and then trigger shutting-off of the faucet 604. The control console 606 can be used to define such a maximum height. For example, a user can issue a voice command 642 to the control console 606 such as "Change Max Water Level Shutoff", receive a confirmation from the control console 606 such as from a speaker within the control console (which can be similar to the speaker discussed with respect to other embodiments herein), and then, after receiving the confirmation from the speaker (e.g., "Ok, how close to tub height would you like to initiate auto shut off?"), the user can respond by saying "One foot." Thus, using the control console 606 and a sensor disposed on the touch free faucet 604, the user can set a max height of water in the tub.

In some embodiments, one or more sensors can be attached to an interior portion of the tub 602 and be used to detect water level, water temperature, and or other characteristics. For example, one or more sensors can be attached to an interior portion of the tub 602 using a suction cup on a portion of the one or more sensors. The one or more sensors attached to an interior portion of the tub 602 can include or be coupled with a wireless transceiver that can send a signal to the control console 606 and/or the faucet 604 when the water level in the tub reaches the one or more sensor. Such a signal transmitted to the control console and/or the faucet 604 can be by the example protocols discussed herein.

In some embodiments, operations of the touch free faucet 604, such as those discussed above, can be controlled with the Smart Home System Hub 340 and/or the Smart Home Control Device 301 discussed above. As discussed above, the control console 606 can be installed on the tub or can be portable with wireless communication with the Logic Processor 303. In some embodiments, networked computing devices, which can include a smartphone, a portable computing system, or any other computing system capable of wireless communications, can be programmed to communicate with the touch free faucet 604 and/or the control console 606 via communications links. These communications links can include wireless or wired networking protocols. Example protocols include Wi-Fi, Bluetooth, ZigBee, Z-wave, or radio frequency such as near field communication. The communication links can also include other protocols such as cellular telephony infrared, satellite transmission, proprietary protocols, combinations of the same, and the like. For example, a user can use a smartphone to communicate with the control console 606 and/or the faucet 604 to control operations of one or more faucets within the tub environment 600.

Control environment 650 in FIG. 6 shows a close up view of an embodiment of a control console 652. The control console 652 can be similar to the control console 606 discussed above. The control console 652 can have a display panel 654 to display properties such as water flow, water temperature, water run time, and can include other features such as a time clock. The display panel 654 can also display other information and can be located on various areas of the control console 652, such as a top surface of the control console 652. The control console 652 can include one or more microphones 670 and/or one or more sensors. For example, the control console 652 can include a sensor A 662, a sensor B 664, a sensor C 666, and a sensor E 668 that can be distributed on various areas of the control console 652.

The touch free faucet 604 and/or the control consoles 606 and/or 652 can be used to control operation of a drain plug in the tub 602. For example, the tub 602 can include a drain plug that includes a motor that can move a drain valve on the drain plug up and/or down to allow water from the tub 602 to drain through the drain plug. The drain plug can include a power source or supply such as that described herein and a wireless receiver. The wireless receiver of the drain plug can receive instructions from the touch free faucet 604 and/or the control console 606 and/or the control console 652. These instructions may include an order to open the drain valve on the drain plug. Such instructions may come from a sensor on the touch free faucet 604, and/or a sensor on the control consoles 606 and/or 652. Such instructions may come from a voice command 642 by a user, such as that described above, wherein the voice instruction is processed by a logic processor in the touch free faucet 604 and/or the control console 606 and/or the control console 652, and, after the voice instruction is processed, the logic processor can transmit a signal regarding the voice instruction that can be received by the wireless receiver on the drain plug. The drain plug, after receiving the transmitted instruction from the logic processor, can communicate the instruction to the motor in the drain plug and control the drain valve in order to open or close the drain valve and permit (or not permit) water from the tub 602 to exit the tub 602 through the drain plug.

Figure 7:
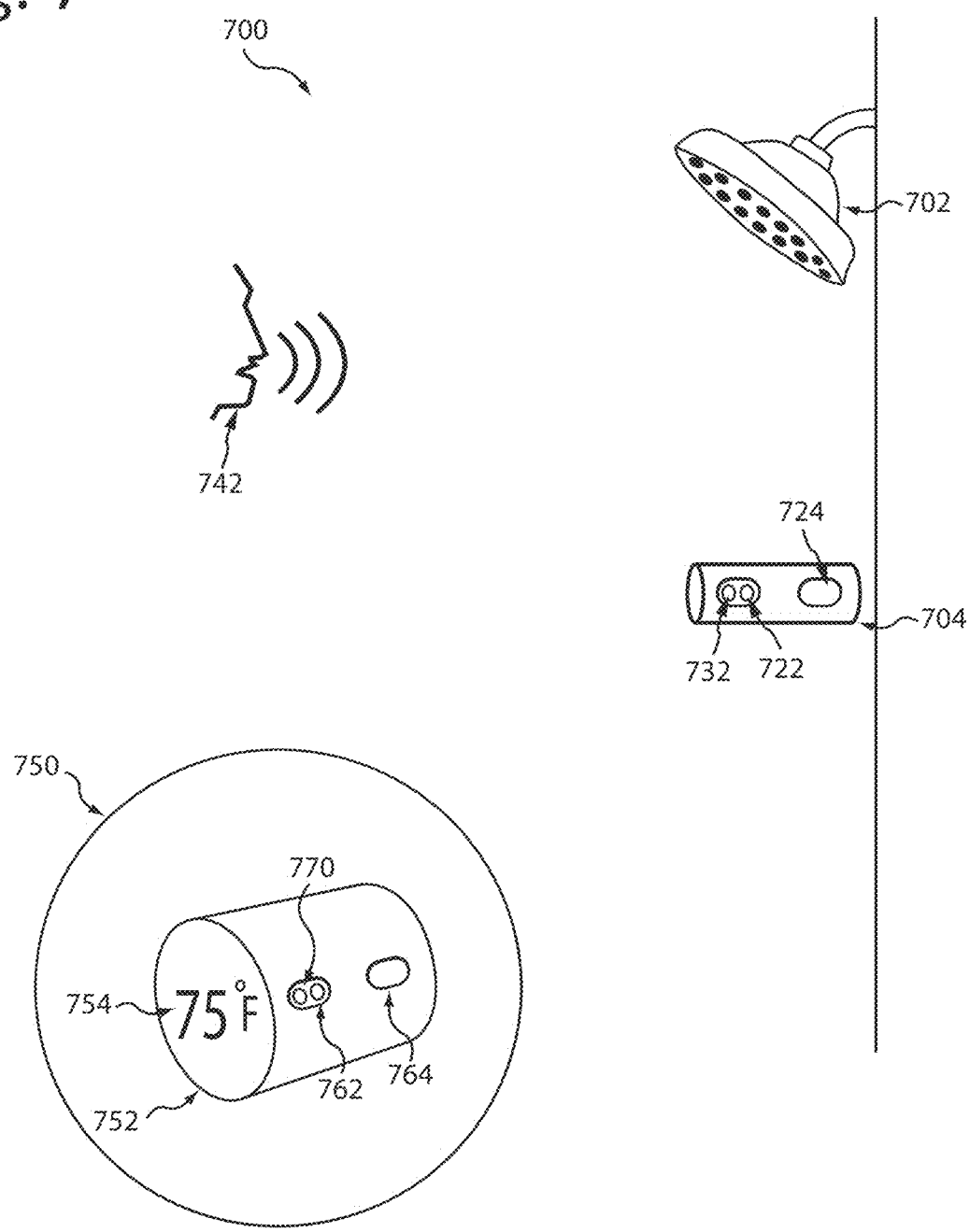
FIG. 7 illustrates a touch free shower head including voice control and sensor control in a shower environment.

FIG. 7 illustrates a Touch Free Smart Shower Faucet 700 including voice control components and/or sensor control components. While FIG. 7 shows one touch free shower head 702, the Touch Free Smart Shower Faucet 700 can include more than one shower head 702, such as two, three, four, five, six, or seven or more shower heads 702. The one or more shower heads 702 can interact with one or more control consoles 704. Such interaction can be by communication protocols discussed herein. The one or more control consoles 704 can be located in various areas in a shower environment, such as on a shower wall proximate to the one or more shower heads 702. In some embodiments, the one or more control consoles 704 are located in areas away from the one or more shower heads 702 to reduce the likelihood that water will splash onto a portion of the control console 704 and/or reduce the noise that can be picked up by a microphone that can be included in the control console 704. For example, in one embodiment a control console 704 is mounted to a shower wall opposite the shower wall that a shower head 702 is mounted to.

The control console 704 can include one or more microphones and/or one or more sensors. For example, the control console 704 can include one, two, three, four, five, six, or seven or more microphones. Further, the control console 704 can include one, two, three, four, five, six, or seven or more sensors. The one or more microphones and/or the one or more sensors can be located on various areas on the control console 704. In some embodiments, the shower head 702 can include one or more microphones and/or one or more sensors. The one or more microphones and/or one or more sensors on the shower head 702 can be located in various places on the shower head 702, for example, on a back portion of the shower head 702.

The control console 704 can be unattached to the shower head 702, and can be portable (e.g., not mounted to any wall nearby the shower environment but rather movable to be placed atop other surfaces). For example, the control console 704 can be placed atop an area near to the shower if a user so desires (e.g., a user may find that the control console 704 should be placed on a table stand nearby the shower). Alternatively, the control console 704 can be at least partially secured to an area near to the shower head 702, such as a shower wall. For example, the control console 704 can be secured to a shower wall with an adhesive attachment or one or more suction cups disposed on a portion of the control console 704, or the control console 704 can be secured to a shower wall with fasteners (e.g., brackets fastened with screws or bolts that mount the control console 704 to a shower wall).

The control console 704 can have one or more sensors and/or one or more microphones similar to other embodiments discussed herein. Further, the shower head 702 can have one or more sensors and/or one or more microphones. Alternatively, the shower head 702 can have no sensors and/or no microphones, but have a wireless or wired transceiver which can receive instructions from the control console 704 and communicate such received instructions to a logic processor which can control operation of one or more mechanical valves based on the received instructions. In some embodiments, for example, it can be advantageous to have a shower head 702 that has no sensors so that such sensors do not get unintentionally triggered or utilized when a user is in the shower within regions of the sensor zone or zones. Thus, having most if not all of the sensors be in the control console 704 can simplify operations of the shower head 702 and a user can find it convenient if the sensors are in one location (the control console 702) that can be movable or attached to an area nearby the shower. Further, it can also be advantageous to have the one or more microphones in the control console 704 as opposed to on the shower head 702 to reduce noise of the water sounds and interference between water sounds and a voice command 742.

In some embodiments, the control console 704 can include two sensors, such as a sensor A 722 and a sensor B 724, and a microphone 732. The control console 704 can be secured to or separated from shower head 702 and/or a wall nearby the shower head 702. The control console 704 can control operations of the shower head 702 including but not limited to: adjusting water flow rate and/or temperature; defining a user preset of water flow and/or temperature (e.g., "Preset 1" could define a save setting where the water temperature is 90 degrees); defining a maximum water temperature permitted by the shower head 702; and defining an automatic shut off feature (e.g., the shower head 702 turns off after 20 minutes unless a voice signal or motion signal is received by the control console 704). A user can control such operations by issuing a voice command 742 to the control console 704 or by activating one or more sensors disposed on the control console 704.

The shower head 702 can have one or more sensors disposed on a spout surface (the surface of the shower head 702 that points towards or faces a basin area such as a shower floor. In such embodiment, a user can wave or otherwise move a body part or object in front of the sensor disposed on the spout surface and cause water to flow out of the shower head 702.

In some embodiments, one or more sensors can be attached to one or more shower walls. The one or more sensors can be used to detect the presence of a user, for example, and automatically being flowing water after a set time. For example, a user can utilize the control console 704 to program that, upon sensing an object, the one or more sensors on a shower wall can trigger heating up water to a programmable temperature, and then, upon reaching that temperature, initiate the flow of water through the shower head 702. The one or more sensors attached to one or more shower walls can include a wireless transceiver that can communicate with the control console 704 and/or the shower head 702 via communication links or protocols such as those discussed herein.

In some embodiments, operations of the one or more shower heads 702, such as those discussed above, can be controlled with the Smart Home System Hub 340 and/or the Smart Home Control Device 301 discussed above. As discussed above, the control console 704 can be installed on the one or more shower heads 702 or a wall nearby, or can be portable with wireless communication with the Logic Processor 303. In some embodiments, networked computing devices, which can include a smartphone, a portable computing system, or any other computing system capable of wireless communications, can be programmed to communicate with one or more shower heads 702 and/or the control console 704 via communications links. These communications links can include wireless or wired networking protocols. Example protocols include Wi-Fi, Bluetooth, ZigBee, Z-wave, or radio frequency such as near field communication. The communication links can also include other protocols such as cellular telephony infrared, satellite transmission, proprietary protocols, combinations of the same, and the like. For example, a user can use a smartphone to communicate with the control console 704 and/or the one or more showers heads 702 to control operations of one or more faucets one or more showers heads 702.

Control environment 750 in FIG. 7 shows a close up view of an embodiment of a control console 752 that can be used to control operation of the one or more shower heads 702. The control console 752 can be similar to the control console 702 discussed above. The control console 752 can have a display panel 754 to display properties such as water flow, water temperature, water run time, and can include other features such as a time clock. The display panel 754 can also display other information and can be located on various areas of the control console 752, such as a top surface of the control console 752. The control console 752 can include one or more microphones 770 and/or one or more sensors. For example, the control console 752 can include a sensor A 762, a sensor B 764, and a microphone 770 that can be distributed on various areas of the control console 752.

The control console 704 and/or 752 can include additional components and features to provide users convenient means of interacting with a bathing environment. For example, the control console 704 and/or 752 can include a speaker component that can be in communication with the logic processor described herein to provide a user information relating to a touch free faucet or shower head 702. In some embodiments, the shower head 702 includes a temperature sensor component located within a spout of the shower head 702, wherein the temperature sensor component includes a wireless transmitter capable of communicating via wired and/or wireless means with the control console 704 and/or 752 and transmitting the temperature of water flowing through the spout of the shower head 702. Alternatively, the wireless transmitter can transmit the temperature of water flowing through the spout of the shower head 702 to a networked computing device or system hub like those described herein. Further, in some embodiments, the control console 704 and/or 752 includes a wireless receiver capable of receiving a transmitted water temperature from the temperature sensor component on the shower head 702. The communication between the wireless transmitter of the temperature sensor component and the wireless receiver of the control console 704 and/or 752 can include any of the protocols discussed herein. The wireless receiver of the control console 704 and/or 752 can communicate the received water temperature to a logic processor of the control console. Further, the logic processor of the control console 704 and/or 752 can be programmed to determine whether the received water temperature matches a preset threshold, and if it does, the logic processor can communicate with the speaker and instruct the speaker to issue a sound or phrase that can be used to inform a user that the water temperature has reached a value desirable to a user. This can be significantly advantageous because a user can turn on the shower head 702, walk away, and be notified by, for example, an alarm or sound transmitted by the speaker when the water temperature has reached a desirable temperature. This can not only be convenient for a user not wishing to get into a shower environment before the water temperature is desirable, but also to minimize water use that can result when users turn showers on, assume a task away from the shower environment, and then end up returning well after the water temperature has reached a desirable point.

In some embodiments of the touch free faucets described herein, the touch free faucets contain a water temperature sensor in communication with a logic processor, a logic processor, and a speaker which can all interact to carry out the process described above. For example, a touch free faucet in a bathroom or kitchen sink can include a water temperature sensor that communicates (either intermittently or continuously) water temperature flowing through the faucet to the logic processor and the logic processor can be programmed to instruct the speaker component to transmit an audio sound or phrase that can notify a user that the temperature has reached an acceptable or desirable point.

It should be understood that in some embodiments a bathing environment can include features from FIG. 6 and FIG. 7. For example, a bathing environment can include one or more touch free faucets, such as faucet 604, and one or more shower heads, such as shower head 702. In some embodiments, one or more touch free faucets and one or more shower heads in a bathing environment can be controllable using the voice control components and/or sensor control components discussed in the present application. Further, such bathing environments can also include one or more control consoles such as those discussed herein. Thus, the present disclosure includes embodiments where a user can control aspects and/or features of one or more touch free faucets and/or one or more shower heads using voice control and/or sensor control operations such as those discussed herein.

Figure 8:
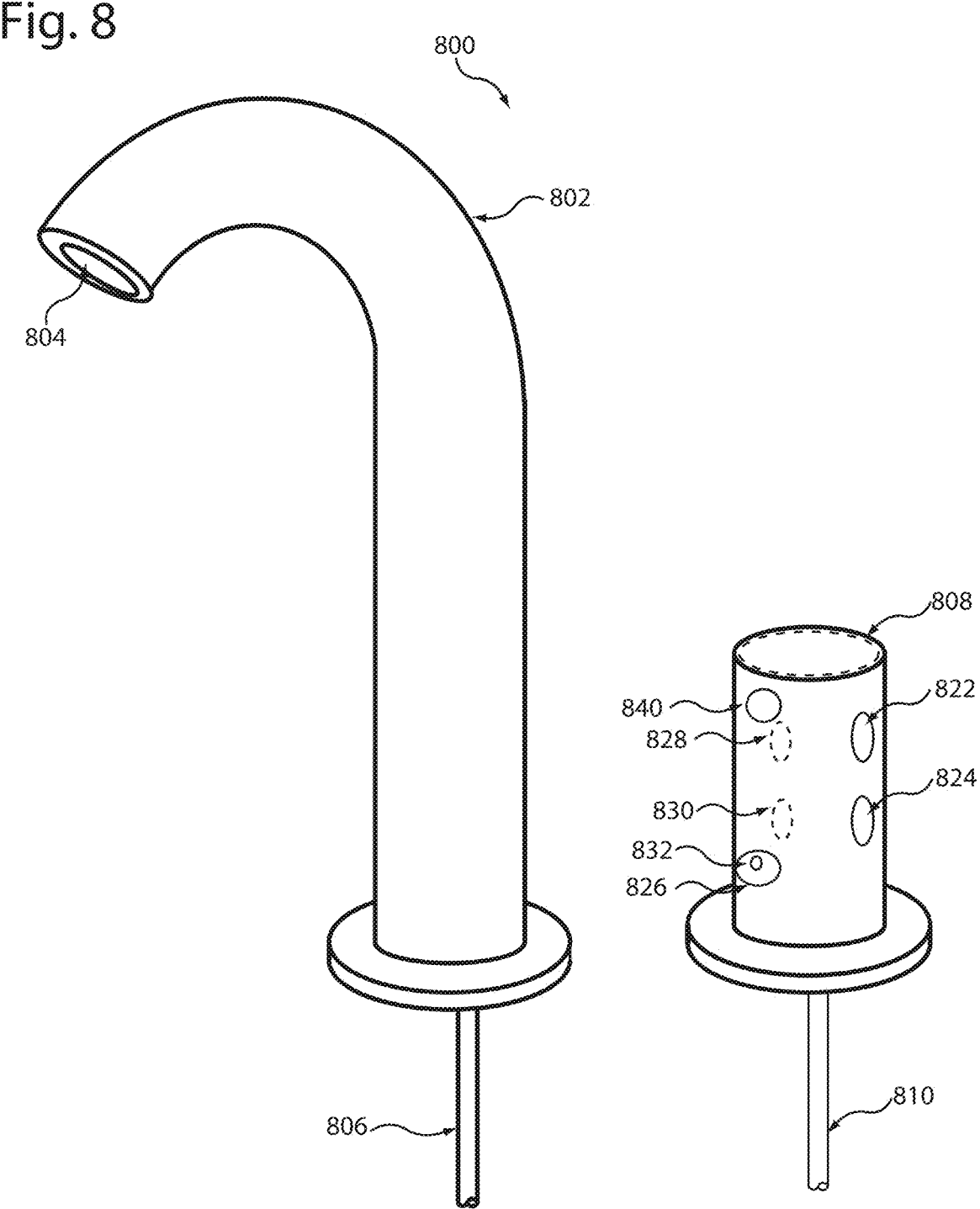
FIG. 8 illustrates a touch free faucet including a control module with voice control and sensor control.

FIG. 8 illustrates a touch free faucet 800 with a faucet body 802, a faucet outlet 804 that can allow water to flow out of the faucet 800, and a water inlet line 806 which can allow water to flow to the faucet 800. The touch free faucet 800 can interact with a control module 808 which can be attached to the faucet 800 or separate from the faucet 800. As shown in FIG. 8, control module 808 can include one or more sensors, such as one, two, three, four, five, six, or seven or more sensors. For example, control module 808 can include a Sensor A 822, a Sensor B 824, and a Sensor C 826. Sensor locations 828 and 830 illustrate other locations where the one or more sensors can be placed. In some embodiments, the control module 808 can include five sensors, such as a Sensor A 822, a Sensor B 824, a Sensor C 826, a Sensor D 828, and a Sensor E 830 as described and/or illustrated in the five sensor system in U.S. Pat. Nos. 9,347,207 and 9,057,183 to Chen which are both incorporated by reference herein in their entireties. The one or more sensors can be located in various positions on the control module 808. The one or more sensors can be similar to those described in the present application, and can be used to detect motion by a user. The control module 808 can include one or more LED indicators 832, such as one, two, three, four or five or more LED indicators. The LED indicator 832 can advantageously show or display various characteristics and/or attributes of the touch free faucet 800 and/or control module 808. For example, the LED indicator 832 can display whether the control module 808 is powered on, whether the faucet 800 is permitting water flow, or other characteristics and/or attributes related to the touch free faucet 800 and/or control module 808. The control module 808 can include one or more microphones 840. For example, the control module 808 can include one, two, three, four, five, or six or more microphones 840. The one or more microphones 840 can be located on various portions of the control module 808. The one or more microphones 840 can be similar to those described in the present disclosure and can be used for purposes also described throughout this disclosure. The control module 808 to the control consoles described in the present disclosure. Further, the touch free faucet 800 can also be similar to the touch free faucets described in the present disclosure.

The touch free faucet 800 and control module 808 can interact with one or more mechanical valves to control operations of the touch free faucet 800. For example, in some embodiments, the control module 808 includes a wire 810 that connects to an electronic valve control unit which can control operation of one or more mechanical valves. In other embodiments, the control module 808 does not include a wire 810, but rather, includes a wireless transmitted or transceiver that can communicate with the electronic valve control unit to control operation of the one or more mechanical valves. In some embodiments, a user can interact with the control module 808 in order to control operation of the touch free faucet 800. For example, a user can place an object or body part in front of the one or more sensors located on the control module 808. Alternatively, a user can issue a voice command to the control module 808 and the control module 808, in response to the command, can transmit a wireless or wired communication to an electronic valve control unit to control operation of the one or more mechanical valves to permit or not permit water to flow through faucet 800.

Figure 9:
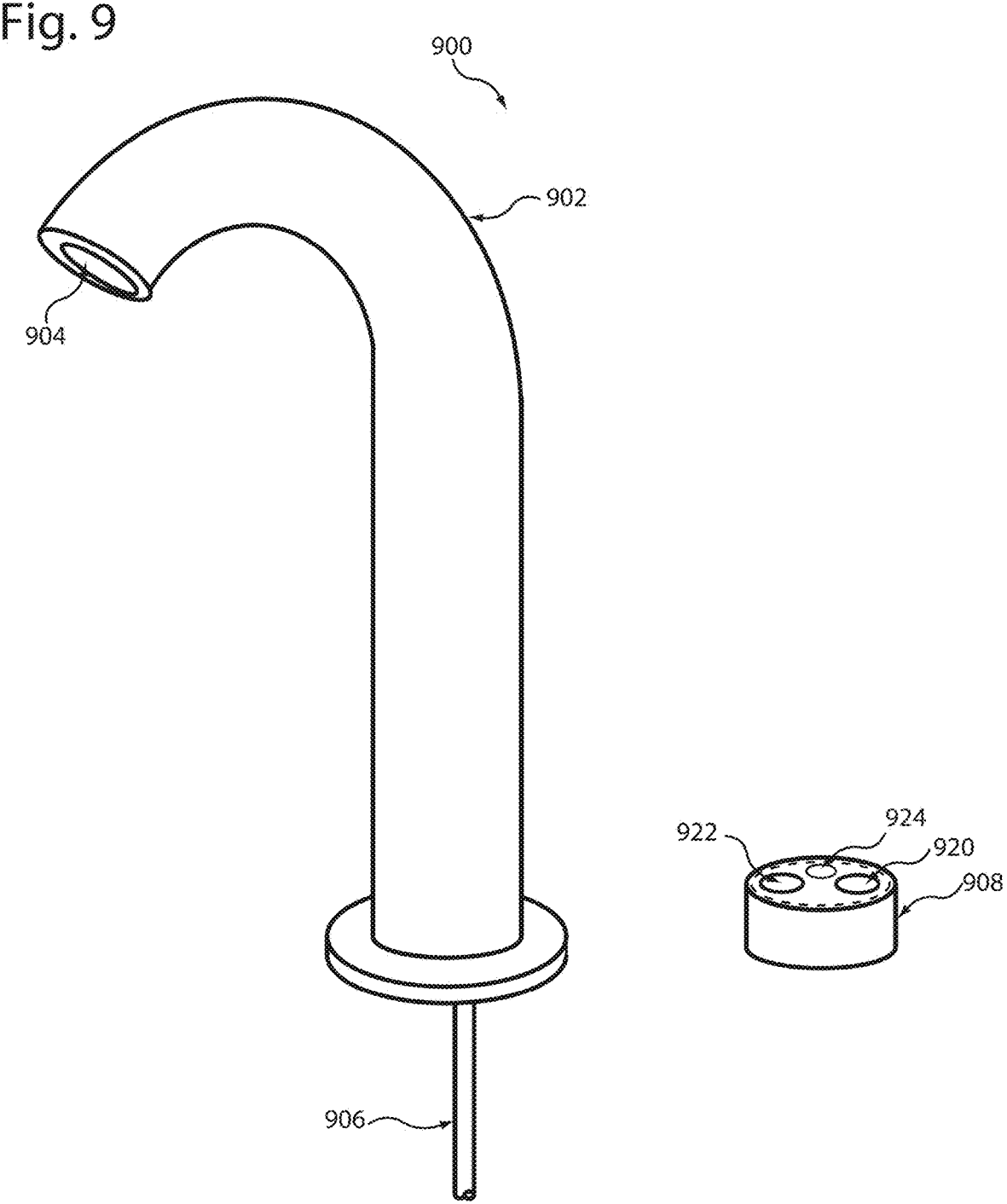
FIG. 9 illustrates another embodiment of a touch free faucet including a control module with voice control and sensor control.

FIG. 9 illustrates another embodiment of a touch free faucet 900 and a control module 908. In some embodiments, the control module 908 is smaller than the control modules and/or control consoles described herein, which can be advantageous in environments where a faucet can be present where conservation of space is a concern. The touch free faucet 900 and/or the control module 908 can be similar to other touch free faucets and control consoles/modules described herein. The touch free faucet 900 can include a faucet body 902 (which can have a continuous cross section), a faucet outlet 904 that can allow water to flow out of the faucet 900, and a water inlet line 906 which can allow water to flow to the faucet 900. The control module 908 can include one or more microphones 920, such as one, two, three, four, five or six or more microphones 920. The control module 908 can include one or more sensors, such as one, two, three, four, five or six or more sensors. For example, in one embodiment, the control module 908 includes a Sensor A 922 that can turn on and/or off the touch free faucet 900 and a microphone 920 that can be used for controlling operations of the touch free faucet 900 through voice commands. The control module 908 can include one or more LED indicators 924. The one or more microphones, one or more sensors, and/or one or more LED indicators of FIG. 9 can be similar to those described in the present disclosure.

Figure 10:
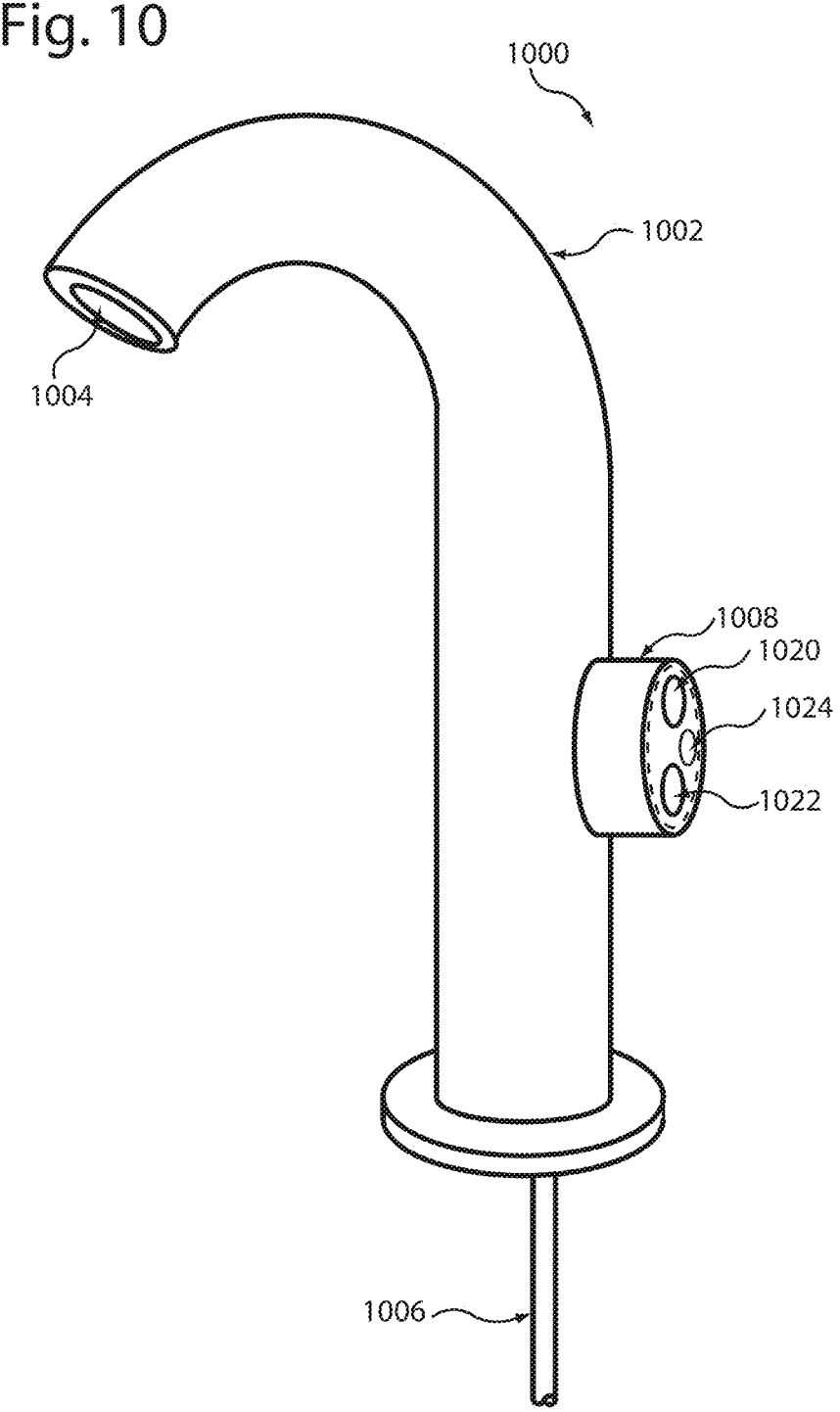
FIG. 10 illustrates another embodiment of a touch free faucet including a control module with voice control and sensor control, wherein the control module is mounted to the touch free faucet.

FIG. 10 illustrates another embodiment of the touch free faucet and control module of FIG. 9, wherein the control module is secured to the touch free faucet. Such securement of the control module to the touch free faucet can be a physical locking, holding, stabilizing without locking, retaining, stabilizing to prevent movement, stabilizing to minimize or reduce the likelihood of movement, or another type of securement. Such securement can also be by a removable attachment, such as with the use of a plurality of hook and loop structures (e.g., Velcro), buckles, suction cup(s) fungi-like attachment, and/or other attachment structures or methods. Alternatively, the control module can be integrally formed with the touch free faucet. As shown in FIG. 10, the touch free faucet 1000 can include a faucet body 1002, a faucet outlet 1004 that can allow water to flow out of the faucet 1000, and a water inlet line 1006 which can allow water to flow to the faucet 1000.

The control module 1008 can include one or more microphones 1020, such as one, two, three, four, five or six or more microphones 1020. The control module 1008 can include one or more sensors, such as one, two, three, four, five or six or more sensors. For example, in one embodiment, the control module 1008 includes a Sensor A 1022 that can turn on and/or off water flowing through the touch free faucet 1000 and a microphone 1020 that can be used for controlling operations of the touch free faucet 1000 through voice commands. The control module 1008 can include one or more LED indicators 1024. The one or more microphones, one or more sensors, and/or one or more LED indicators of FIG. 10 can be similar to those described in the present disclosure.

It should be noted that use of the phrase "touch free" in the embodiments of the touch free faucets and/or control consoles described herein should not be understood as limiting the scope of the disclosure to encompass a faucet that cannot be touched or whose operation and functionality cannot be altered by "touching." Rather, use of the phrase "touch free" herein means that the faucets described herein are capable of being operated without being "touched," for example, by the one or more sensors, one or more microphones, or by the networked computing devices discussed herein. In some embodiments, the touch free faucets and/or control consoles/module discussed herein can be powered on by a switch or button that can be located on the touch free faucets and/or control consoles/modules and/or a switch or a button located on a power supply connected to the touch free faucets and/or control consoles/modules. Indeed, in some embodiments, the touch free faucets include a switch or button that can permit a user to turn on or off various aspects of the faucet. For example, a user wishing to turn off one or more sensors and/or one or more microphones can press a button or a switch located on the touch free faucet and/or a control console/module. In some embodiments, the touch free faucet includes a mechanical handle (such as in traditional faucets) which may be used as an alternative or in addition to the "touch free" methods of operation described herein. Further, the touch free faucets discussed herein can include an extendable spout at an end of the touch free faucet that can be "touched" and/or manipulated by a user to point the direction of water flow in a desired direction.

The headings provided herein, if any, are for convenience only and do not necessarily affect the scope or meaning of the claimed invention. Although several embodiments, examples and illustrations are disclosed herein, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can include several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "proximal," "distal," "front," "back," "rear," and "side" describe the orientation and/or location of portions of the components or elements within a consistent but arbitrary frame of reference which is made clear by reference to the text and the associated drawings describing the components or elements under discussion. Such terminology may include the words specifically mentioned above, derivatives thereof, and words of similar import.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

What is claimed is:

1. A touch free faucet configured to permit water to flow into a basin area comprising:
    a motion sensor configured to generate an activation signal in response to detecting a motion within a sensor zone and communicate such generated activation signal to a hardware processor, wherein the hardware processor is configured to control operation of one or more mechanical valves to place the touch free faucet into a flow mode based on the generated activation signal;
    a temperature sensor configured to detect a temperature of water flowing through the touch free faucet and communicate the detected water temperature to the hardware processor;
    a first microphone configured to:
        detect a first sound signal responsive to a first voice command by a user, the first voice command corresponding to a first instruction to increase the temperature of water flowing through the touch free faucet;
        communicate the detected first sound signal to the hardware processor, the hardware processor further configured to convert the detected first sound signal into a digital format and control operation of the one or more mechanical valves based on the converted, digitally-formatted first sound signal;
        detect a second sound signal responsive to a second voice command by the user, the second voice command corresponding to a second instruction to disable the motion sensor for a predetermined period of time; and
        communicate the detected second sound signal to the hardware processor, the hardware processor further configured to disable the motion sensor for the pre-determined period of time based on the detected second sound signal; and
    a power supply configured to provide power to the touch free faucet;
    wherein the hardware processor is configured to compare the temperature of water flowing through the touch free faucet with a preset maximum value and control operation of the one or more mechanical valves to maintain the temperature at or below the preset maximum value based on the comparison.

2. The touch free faucet of claim 1, further comprising a speaker, wherein, when the hardware processor controls operation of the one or more mechanical valves based on the converted, digitally-formatted first sound signal, the hardware processor instructs the speaker to transmit a confirmation sound or phrase.

3. The touch free faucet of claim 1, further comprising a memory unit in communication with the hardware processor, the memory unit configured to store the preset maximum value.

4. The touch free faucet of claim 1, further comprising:
a second microphone located on a front surface of the touch free faucet facing the basin area and configured to detect and communicate sound signals originating from water flowing through the touch free faucet and contacting the basin area to the hardware processor;
wherein the first microphone is located on a back surface of the touch free faucet facing away from the basin area, and wherein the hardware processor is configured to store the communicated sound signals from the second microphone in a memory unit.

5. The touch free faucet of claim 1, wherein the flow mode comprises a continuous flow mode.

6. The touch free faucet of claim 5, wherein, when the touch free faucet is operating in the continuous flow mode and the hardware processor fails to receive a generated activation signal from the motion sensor and a detected first or second sound signal from the first microphone for a preset time period, the hardware processor automatically controls operation of the one or more mechanical valves to stop water from flowing through the touch free faucet.

7. The touch free faucet of claim 1, further comprising a wireless receiver configured to receive digital instructions over a communication protocol and communicate the received digital instructions to the hardware processor to control operation of the one or more mechanical valves.

8. The touch free faucet of claim 1, wherein the touch free faucet is a bathroom faucet.

9. The touch free faucet of claim 1, wherein the basin area is a bathroom tub.

10. A touch free faucet configured to permit water to flow into a basin area comprising:
a first microphone configured to detect a first sound signal;
a second microphone configured to detect a second sound signal;
one or more hardware processors configured to:
receive the detected first sound signal from the first microphone at a first time, the first sound signal originating from water flowing through the touch free faucet and into the basin area;
receive the detected second sound signal from the second microphone at the first time, the second sound signal originating from a voice command by a user, the voice command comprising an instruction to increase a temperature of water flowing through the touch free faucet; and
control operation of the touch free faucet based on the detected first sound signal and the detected second signal, wherein placement of the first microphone and the second microphone enables the one or more hardware processors to distinguish the first sound signal from the second sound signal; and
wherein the one or more hardware processors are further configured to simultaneously:
store the detected first sound signal in a memory unit and create a first frequency profile based on the detected first sound signal;
store the detected second sound signal in the memory unit and create a second frequency profile based on the detected second sound signal; and
create a filtered frequency profile representative of the difference between the second frequency profile and the first frequency profile; and
a temperature sensor configured to detect a temperature of water flowing through the touch free faucet and communicate the detected water temperature to the one or more hardware processors, wherein the one or more hardware processors are configured to compare the temperature of water flowing through the touch free faucet with a preset maximum value and control operation of one or more mechanical valves to maintain the temperature at or below the preset maximum value based on the comparison.

11. The touch free faucet of claim 10, wherein the first microphone is located on a front surface of the touch free faucet facing the basin area and the second microphone is located on a back surface of the touch free faucet facing away from the basin area.

12. The touch free faucet of claim 10, further comprising a speech recognition module in communication with the one or more hardware processors, wherein, if the filtered frequency profile is greater than a predetermined threshold, the one or more hardware processors instruct the speech recognition module to analyze and convert the filtered frequency profile to a digital format, whereby the one or more hardware processors control operation of one or more mechanical valves based on the converted, digitally-formatted filtered frequency profile.

13. The touch free faucet of claim 10, further comprising a motion sensor configured to generate an activation signal in response to detecting a motion within a sensor zone and communicate such generated activation signal to the one or more hardware processors, wherein the one or more hardware processors are configured to control operation of the one or more mechanical valves to place the touch free faucet into a flow mode based on the generated activation signal.

14. A touch free faucet configured to permit water to flow into a basin area comprising:
a motion sensor configured to generate an activation signal in response to detecting motion and communicate such activation signal to a logic processor to control operation of one or more mechanical valves;
a temperature sensor configured to detect a temperature of water flowing through the touch free faucet and communicate the detected water temperature to the logic processor;
a first microphone configured to:
detect a first sound signal corresponding to a first instruction to increase the temperature of water flowing through the touch free faucet and communicate the detected first sound signal to the logic processor, the logic processor further configured to control operation of the one or more mechanical valves based on the first sound signal; and
detect a second sound signal corresponding to a second instruction to disable the motion sensor for a predetermined period of time and communicate the detected second sound signal to the logic processor, the logic processor further configured to disable the motion sensor for the pre-determined period of time;
and a wireless receiver configured to receive digital instructions over a communication protocol and communicate the received digital instructions to the logic processor, the logic processor configured to control operation of the one or more mechanical valves based on the digital instructions received from the wireless receiver;

wherein the logic processor is configured to compare the temperature of water flowing through the touch free faucet with a preset maximum value and control operation of the one or more mechanical valves to maintain the temperature at or below the preset maximum value.

15. The touch free faucet of claim 14, wherein the wireless receiver is configured to receive digital instructions from a networked computing device.

16. The touch free faucet of claim 14, wherein the received digital instructions comprise a command to control operation of the one or more mechanical valves to permit water to flow through the touch free faucet at the preset maximum value temperature.

17. The touch free faucet of claim 14, wherein the communication protocol is selected from the group consisting of Z-Wave, cellular telephony, infrared, and satellite transmission.

18. The touch free faucet of claim 14, further comprising a power supply configured to provide power to the touch free faucet.

19. The touch free faucet of claim 14, wherein the touch free faucet is a shower faucet.

20. The touch free faucet of claim 15, wherein the networked computing device is a smartphone.

\* \* \* \* \*